US010867189B2

(12) United States Patent
Yoo et al.

(10) Patent No.: US 10,867,189 B2
(45) Date of Patent: Dec. 15, 2020

(54) SYSTEMS AND METHODS FOR LANE-MARKER DETECTION

(71) Applicant: QUALCOMM Incorporated, San Diego, CA (US)

(72) Inventors: Seungwoo Yoo, Yongin-si (KR); Duck Hoon Kim, Seoul (KR)

(73) Assignee: QUALCOMM Incorporated, San Diego, CA (US)

(*) Notice: Subject to any disclaimer, the term of this patent is extended or adjusted under 35 U.S.C. 154(b) by 128 days.

(21) Appl. No.: 15/659,384

(22) Filed: Jul. 25, 2017

(65) Prior Publication Data

US 2018/0189577 A1 Jul. 5, 2018

Related U.S. Application Data

(60) Provisional application No. 62/442,420, filed on Jan. 4, 2017.

(51) Int. Cl.
*G06K 9/00* (2006.01)
*G06T 7/593* (2017.01)
*G06T 7/181* (2017.01)
*G06T 7/13* (2017.01)
*G06K 9/46* (2006.01)
*H04N 13/00* (2018.01)
*H04N 13/133* (2018.01)

(52) U.S. Cl.
CPC .......... *G06K 9/00798* (2013.01); *G06T 7/13* (2017.01); *G06T 7/181* (2017.01); *G06T 7/593* (2017.01); *G06K 9/4604* (2013.01); *G06K 9/4638* (2013.01); *G06T 2207/10012* (2013.01); *G06T 2207/30256* (2013.01); *H04N 13/133* (2018.05); *H04N 2013/0092* (2013.01)

(58) Field of Classification Search
None
See application file for complete search history.

(56) References Cited

U.S. PATENT DOCUMENTS 7,655,894 B2 * 2/2010 Schofield .................. 250/208.1
9,170,116 B1 10/2015 Joshi et al.
(Continued)

FOREIGN PATENT DOCUMENTS

CN 105354559 A * 2/2016
EP 1918853 A2 5/2008
KR 20120082755 A * 7/2012

OTHER PUBLICATIONS

H. Yoo, U. Yang and K. Sohn, "Gradient-Enhancing Conversion for Illumination-Robust Lane Detection," in IEEE Transactions on Intelligent Transportation Systems, vol. 14, No. 3, pp. 1083-1094, Sep. 2013. doi: 10.1109/TITS.2013.2252427 (Year: 2013).*

(Continued)

*Primary Examiner* — Jiangeng Sun
(74) *Attorney, Agent, or Firm* — Austin Rapp & Hardman, P.C.

(57) ABSTRACT

An electronic device is described. The electronic device includes a memory and a processor in communication with the memory. The processor is configured to receive an image. The processor is also configured to extract a lane response map from the image. The processor is further configured to estimate one or more lane markers based on the lane response map.

22 Claims, 17 Drawing Sheets

(56) References Cited

U.S. PATENT DOCUMENTS

| | | | |
|---|---|---|---|
| 9,286,520 B1 * | 3/2016 | Lo ...................... | G06K 9/00791 |
| 9,286,524 B1 | 3/2016 | Mei et al. | |
| 2008/0109118 A1 * | 5/2008 | Schwartz ........... | G06K 9/00798 |
| | | | 701/1 |
| 2010/0014714 A1 * | 1/2010 | Zhang ................ | G06K 9/00798 |
| | | | 382/104 |
| 2013/0079990 A1 | 3/2013 | Fritsch et al. | |
| 2014/0343842 A1 | 11/2014 | Ranganathan et al. | |
| 2016/0314361 A1 * | 10/2016 | Smith ....................... | G06T 7/73 |
| 2016/0379064 A1 | 12/2016 | Van Beek | |

OTHER PUBLICATIONS

Aly M., "Real time Detection of Lane Markers in Urban Streets", Computer Vision and Pattern Recognition, IEEE Intelligent Vehicles Symposium, Nov. 26, 2014, 6 Pages.
International Search Report and Written Opinion—PCT/US2017/057860—ISA/EPO—dated Jan. 22, 2018.

* cited by examiner

Input Image
1154

Gradient Direction
1194

Gradient Statistics
1198

Gradient Norm
1196

SYSTEMS AND METHODS FOR LANE-MARKER DETECTION

RELATED APPLICATIONS

This application is related to and claims priority from U.S. Provisional Patent Application Ser. No. 62/442,420, filed Jan. 4, 2017, for "SYSTEMS AND METHODS FOR FAST AND ROBUST LANE-MARKER DETECTION."

TECHNICAL FIELD

The present disclosure relates generally to electronic devices. More specifically, the present disclosure relates to systems and methods for fast and robust lane-marker detection.

BACKGROUND

Electronic devices (e.g., cellular telephones, wireless modems, computers, digital music players, Global Positioning System units, Personal Digital Assistants, gaming devices, etc.) have become a part of everyday life. Small computing devices are now placed in everything from vehicles to housing locks. The complexity of electronic devices has increased dramatically in the last few years. For example, many electronic devices have one or more processors that help control the device, as well as a number of digital circuits to support the processor and other parts of the device.

Some electronic devices (e.g., vehicles) may be equipped with advanced driver assistance systems. These systems may be a step toward autonomous vehicles. One useful technology in these systems is lane-marker detection. Existing techniques for lane-marker detection may be slow and lack robustness. Systems and methods that provide fast and robust lane-marker detection may therefore be beneficial.

SUMMARY

An electronic device is described. The electronic device includes a memory and a processor in communication with the memory. The processor is configured to receive an image. The processor is also configured to extract a lane response map from the image. The processor is further configured to estimate one or more lane markers based on the lane response map.

The processor may be further configured to transform the lane response map to an inverse-perspective-mapping (IPM) domain. Estimating the one or more lane markers based on the lane response map may include defining one or more sections in the image. One or more straight lane-marker segments may be detected in each of the one or more sections. The one or more straight lane-marker segments may be clustered to obtain one or more lane markers. Defining the one or more sections may be based on at least one of a lane-marker segment width assumption, a predefined detection distance range, or calibration data.

The processor may be further configured to perform a transform in each of the one or more sections. A lane-marker position and a lane-marker orientation may be obtained based on the transform. The processor may be further configured to filter one or more potential straight line segments to reduce false positives.

The processor may be configured to refine the one or more lane markers. The processor may be configured to optimize a score function to obtain the one or more lane markers. The processor may be configured to apply a fitting to the one or more lane markers.

Extracting the lane response map from the image may include performing row-wise one-dimensional (1D) filtering on the image.

The processor may be further configured to convert the image from a red-green-blue (RGB) color model to a grayscale color model. A trained projection model that maximizes intensity distances between a color of a lane marker and a color of a road may be applied.

The processor may be further configured to apply an ego-lane mask to the image to restrict a lane-marker search region.

A method is also described. The method includes receiving an image. The method also includes extracting a lane response map from the image. The method further includes estimating one or more lane markers based on the lane response map.

A non-transitory computer readable medium storing computer executable code is also described. The computer readable medium includes code for causing an electronic device to receive an image. The computer readable medium also includes code for causing the electronic device to extract a lane response map from the image. The computer readable medium further includes code for causing the electronic device to estimate one or more lane markers based on the lane response map.

An apparatus is also described. The apparatus includes means for receiving an image. The apparatus also includes means for extracting a lane response map from the image. The apparatus further includes means for estimating one or more lane markers based on the lane response map.

DETAILED DESCRIPTION

The systems and methods disclosed herein relate to fast and robust lane-marker detection. For example, the systems and methods disclosed herein may enable accurate and robust localization of lane markers in real time.

Some configurations of the systems and methods disclosed herein may reduce the search region of lane markers by using camera calibration information and focusing on the detection of ego lanes. This may enable lane-marker detection at increased frame rates.

Some configurations of the systems and methods disclosed herein may divide an input image into several sections and optimize a global score function to achieve accurate and robust localization of lane markers across the sections. The systems and methods disclosed herein may focus on detecting straight line segments as lane markers in each section. The positions of the lane marker segments may be adjusted by optimizing the global score function to make curved lane markers from the set of straight line segments.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
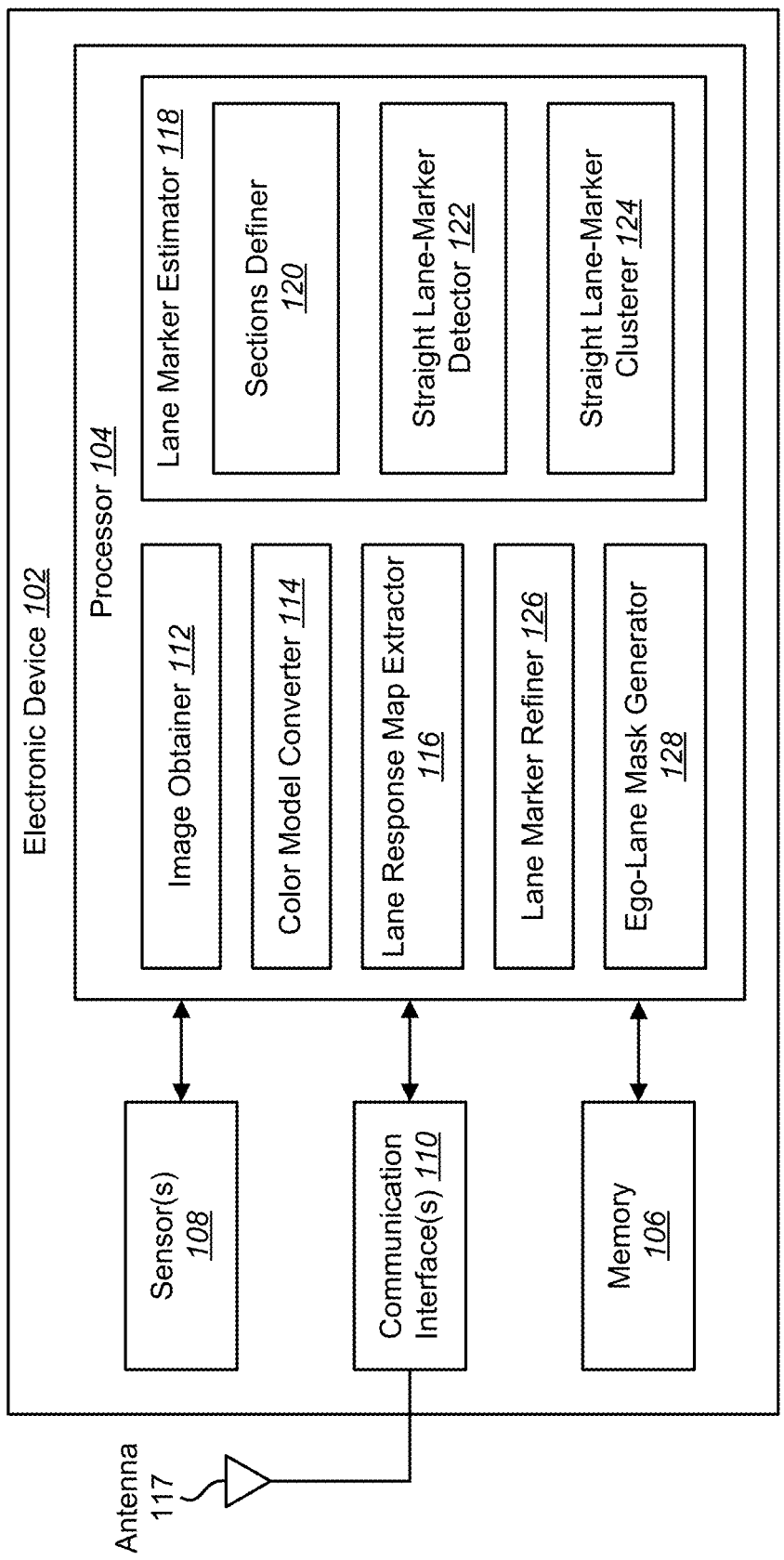
FIG. 1 is a block diagram illustrating one example of an electronic device in which systems and methods for lane-marker detection may be implemented.

FIG. 1 is a block diagram illustrating one example of an electronic device 102 in which systems and methods for lane-marker detection may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, appliances, etc. For instance, the electronic device 102 may be a vehicle that uses an Advanced Driver Assistance System (ADAS).

The electronic device 102 may include one or more components or elements. One or more of the components or elements may be implemented in hardware (e.g., circuitry) or a combination of hardware and software and/or firmware (e.g., a processor 104 with instructions).

The electronic device 102 may be configured to detect one or more lane markers. A lane marker is a device or material on a road surface that conveys information. Examples of lane markers include painted traffic lanes, painted crosswalks, painted parking spaces, handicap parking spaces, reflective markers, curbs, gutters, Botts' dots and rumble strips.

In an automotive context, the electronic device 102 may be a vehicle or may be included in a vehicle. In this context, the vehicle may be driving on a road. Lane markers may be used in autonomous vehicle navigation. For example, a vehicle may include a perception engine. The perception engine may detect key landmarks in an incoming video stream. The perception engine may also localize the key landmarks accurately in the image frames.

Figure 4:
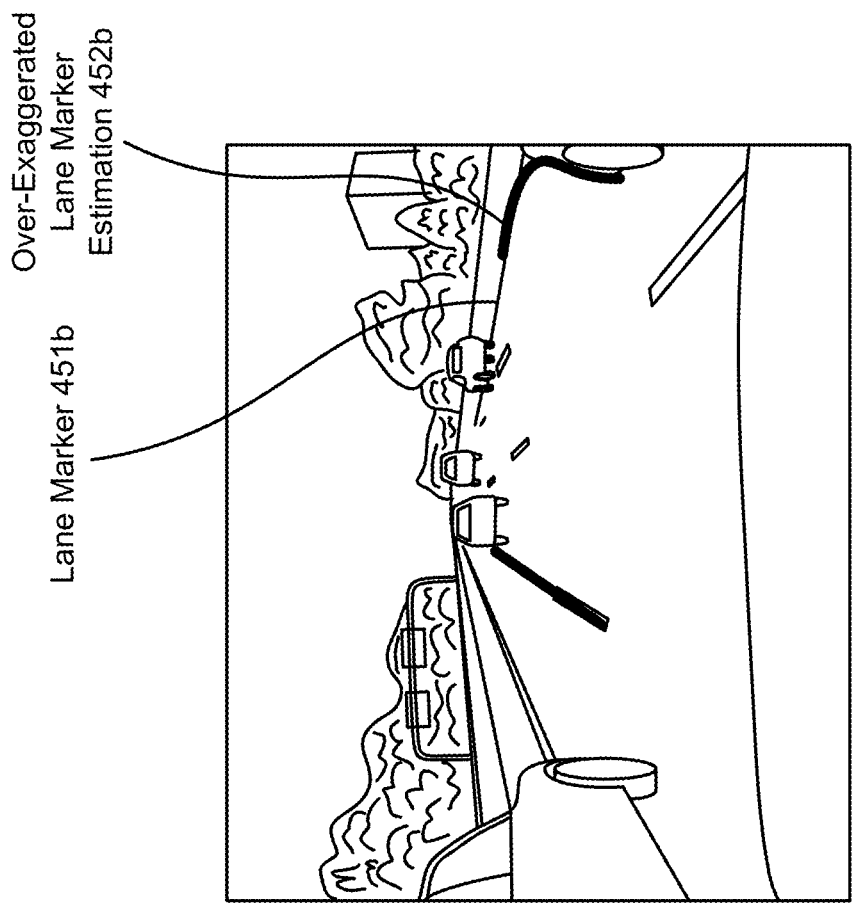
FIG. 4 illustrates some examples of challenges of current lane-marker detection systems and methods.
Figure 4:
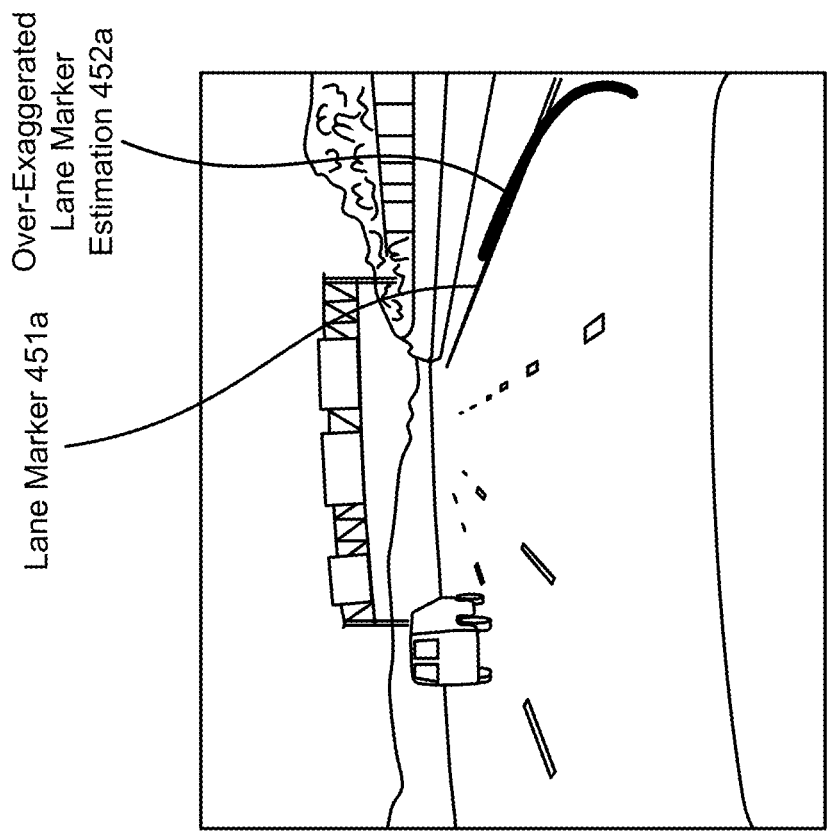

Lane markers are a key landmark to detect and localize in the perception engine for a precise positioning and mapping platform (PPMP). The goal of a lane marker detector (LMD) for PPMP is to accurately and robustly localize lane markers themselves in real time. However, the goal of existing LMDs is to provide not lane markers but lanes for as long as possible for the purpose of advanced driver assistance systems (ADAS) and autonomous driving (AD). Existing LMDs cannot be adopted for PPMP in terms of speed and robustness. For example, lane markers in current LMDs may be over-exaggerated due to the heavy dependence on spline model fitting of the detected lanes, as illustrated in FIG. 4.

As seen in this example, current lane-marker detection suffers from a lack of speed and robustness. Benefits may be realized by detecting lane markers in real time. For example, the electronic device 102 may be configured to accurately detect lane markers in a stream of digital images with minimal delay.

Another problem with current lane-marker detection is power consumption. Processing each image in a stream of images may require a great deal of computing power. This may impact the speed, accuracy and power consumption of the electronic device 102. Benefits may be realized by intelligently filtering and masking captured images to improve the efficiency of lane-marker detection.

In some configurations, the electronic device 102 may include a processor 104, a memory 106, one or more sensors 108, and/or one or more communication interfaces 110. The processor 104 may be coupled to (e.g., in electronic communication with) the memory 106, sensor(s) 108, and/or communication interface(s) 110.

The processor 104 may be a general-purpose single- or multi-chip microprocessor (e.g., an ARM), a special-purpose microprocessor (e.g., a digital signal processor (DSP)), a microcontroller, a programmable gate array, etc. The processor 104 may be referred to as a central processing unit (CPU). Although just a single processor 104 is shown in the electronic device 102, in an alternative configuration, a combination of processors 104 (e.g., an Image Signal Processor (ISP) and an application processor, an ARM and a DSP, etc.) could be used. The processor 104 may be configured to implement one or more of the methods disclosed herein. For example, the processor 104 may be configured to detect one or more lane markers.

The communication interface(s) 110 may enable the electronic device 102 to communicate with one or more other electronic devices 102. For example, the communication interface(s) 110 may provide an interface for wired and/or wireless communications. In some configurations, the communication interface(s) 110 may be coupled to one or more antennas 117 for transmitting and/or receiving radio frequency (RF) signals. Additionally or alternatively, the communication interface(s) 110 may enable one or more kinds of wireline (e.g., Universal Serial Bus (USB), Ethernet, etc.) communication.

In some configurations, multiple communication interfaces 110 may be implemented and/or utilized. For example, one communication interface 110 may be a cellular (e.g., 3G, Long Term Evolution (LTE), Code Division Multiple Access (CDMA), etc.) communication interface 110, another communication interface 110 may be an Ethernet interface, another communication interface 110 may be a universal serial bus (USB) interface, and yet another communication interface 110 may be a wireless local area network (WLAN) interface (e.g., Institute of Electrical and Electronics Engineers (IEEE) 802.11 interface). In some configurations, the communication interface 110 may send information (e.g., image information, surround view information, etc.) to and/or receive information from another electronic device 102 (e.g., a vehicle, a smart phone, a camera, a display, a remote server, etc.).

The electronic device 102 may obtain one or more images (e.g., digital images, image frames, video, etc.) and other sensor data. For example, the electronic device 102 may include sensor(s) 108 such as one or more cameras, a global navigation satellite system receiver and/or an inertia sensor (also referred to as an inertial measurement unit (IMU)). Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.).

The processor 104 may include and/or implement an image obtainer 112. One or more of the image frames may be provided to the image obtainer 112. In some configurations, the image obtainer 112 may operate in accordance with one or more of the approaches, functions, procedures, steps and/or structures described in connection with one or more of FIGS. 1-16. The image obtainer 112 may obtain images from one or more cameras (e.g., normal cameras, wide-angle cameras, fisheye cameras, etc.). For example, the image obtainer 112 may receive image data from one or more sensors 108 and/or from one or more external cameras. The images may be captured from multiple cameras (at different locations, for example). As described above, the image(s) may be captured from the sensor(s) 108 included in the electronic device 102 or may be captured from one or more remote camera(s).

In some configurations, the image obtainer 112 may request and/or receive one or more images. For example, the image obtainer 112 may request and/or receive one or more images from a remote device (e.g., external camera(s), remote server, remote electronic device, etc.) via the communication interface(s) 110.

The processor 104 may include and/or implement a color model converter 114, a lane response map extractor 116, a lane marker estimator 118, a lane marker refiner 126 and an ego-lane mask generator 128.

The color model converter 114 may convert an image from one color model to another color model. For example, the color model converter 114 may convert an image from a RGB color model to a grayscale color model. Converting from a color image to a gray image may improve the detectability of lane markers in the image.

In an implementation, the color model converter 114 may perform a yellow color enhancement. Yellow and orange lane markers tend to lose visual distinctiveness after a general RGB-to-gray conversion. The color model converter 114 may adopt a trained projection model to maximize intensity distances of colors in an input image. The color model converter 114 may use a linear discriminant analysis to maximize the intensity distances. This may increase the contrast between certain colors (e.g., white, orange, yellow) as compared to the road color. An example of the color model conversion is described in connection with FIG. 6.

The lane response map extractor 116 may extract a lane response map from an image. A lane response map may indicate regions in an image that have a higher likelihood of including a lane marker. In an implementation, the lane response map may be defined as $$y_i = 2x_i - (x_{i-\tau} + x_{i+\tau}) - |x_{i-\tau} + x_{i+\tau}|. \quad (1)$$

In Equation (1), $x_i$ indicates the value of a pixel at a position i (e.g., pixel position) in an image. In an implementation, $x_i$ may be a grayscale (e.g., 1-channel) value. A grayscale image may be obtained from conventional color-to-gray conversion or by using learned projection matrices. The term $\tau$ is a pre-defined width for calculating the lane response value $y_i$. The unit of the width parameter of the filter ($\tau$) may be pixels. A left neighbor ($x_{i-\tau}$) is the value of a pixel located $-\tau$ from position i. A right neighbor ($x_{i+\tau}$) is the value of a pixel located $+\tau$ from position i.

The width parameter $\tau$ and the last term ($|x_{i-\tau} + x_{i+\tau}|$) penalize cases in which the difference between pixel values of the left neighbor ($x_{i-\tau}$) and right neighbor ($x_{i+\tau}$) is high. A higher response $y_i$ may be given to a position with similar left and right neighbors.

In an implementation, the values of $y_i$ may be used for ridge detection, where a ridge includes the local maximum points. For example, ridge detection may be used to identify a line or a curve in an image that is likely to be a lane marker.

In another implementation, the $\tau$ parameter may be varied to capture variations in the lane scale and to obtain the largest response. Since lane scale (or width) can vary (due to lane width variation or view point changes, for example), the value of the lane response map extractor 116 may vary the value of the $\tau$ parameter to effectively capture the lane response. To handle lane scale ambiguities, various lane responses from different scales may be determined by varying the value of $\tau$. This approach may also be referred to as a scale space approach.

In an implementation, the lane response map extractor 116 may perform row-wise one-dimensional (1D) filtering on the image to obtain a lane response map. An example of the lane response extraction is described in connection with FIG. 7.

It should be noted that the lane response map extractor 116 may generate the lane response map directly from the received image. In some other approaches, the lane response map is generated from an inverse-perspective-mapping (IPM) of an image.

Basing lane-marker detection on a lane response map that is extracted from the received image (as opposed to the IPM of the image) has computational benefits. From the computation perspective, a goal of the described systems and methods is to speed up the lane-marker detection. If the original image was converted to IPM and then the lane response map was extracted from the IPM, the electronic device 102 would need to transform each image to the IPM view and then extract the lane response map from the IPM. However, by extracting the lane response map from the original image, the electronic device 102 may select a high response map (or regions of the lane response map with a high response) that is more than a predefined threshold for further lane-marker detection. Thus, the electronic device 102 may transform only these pixels to the IPM view. Therefore, extracting a lane response map before generating the IPM view increases speed and reduces processing load, which improves efficiency. Furthermore, this allows the electronic device 102 to focus only on certain lane response maps (e.g., lane response maps that are more than a predefined threshold) for lane-marker detection.

The lane marker estimator 118 may estimate one or more lane markers. The lane marker estimator 118 may include a sections definer 120, a straight lane-marker detector 122 and a straight lane-marker clusterer 124.

In an implementation, the lane marker estimator 118 may convert the lane response map to the IPM domain. This enables the electronic device 102 to reconstruct the lane markers in three dimensions (3D). When converting the input image to an IPM viewpoint, the driving path of the vehicle may be assumed to be a flat surface (or plane). This may be referred to as a plane assumption. An example of the conversion from the lane response map to the IPM domain is described in connection with FIG. 8.

The sections definer 120 may define the one or more sections in an image. A lane can be modeled by concatenating several line segments. In a section of the image, a lane can be modeled by a straight line. Lane detection can be done in each section and the detected lane markers may be clustered to form a long lane. The sections definer 120 may define the sections based on a lane-marker segment width assumption, a pre-defined detection distance range, and/or calibration data (e.g., camera height, pitch and roll). In an implementation, the sections definer 120 may define the sections in the IPM domain. This allows the electronic device 102 to directly estimate a set of lane points in the IPM domain. An example of lane-marker segment estimation is described in connection with FIG. 9.

The straight lane-marker detector 122 may detect one or more straight lane-marker segments in each of the one or more sections. For example, the straight lane-marker detector 122 may perform a transform in each of the one or more sections and obtain a lane-marker position and a lane-marker orientation based on the transform. In an implementation, the electronic device 102 may transform the lane response map to the IPM domain. The straight lane-marker detector 122 may then perform a Radon transform in each section. In another example, the straight lane-marker detector 122 may filter one or more potential straight line segments to reduce false positives. Examples of lane-segment detection are described in connection with FIGS. 10-11.

The straight lane-marker clusterer 124 may cluster the one or more straight lane-marker segments to obtain one or more lane markers. The detected lane segments (e.g., straight lines in the image sections) can be clustered to be a long lane. The clustered straight lines can model an arbitrary shape. In an implementation, the straight lane-marker clusterer 124 may use a density-based clustering algorithm (e.g., density-based spatial clustering of applications with noise (DBSCAN)) to obtain an initial clustering of the one or more straight lane-marker segments between the sections.

The lane marker refiner 126 may refine the one or more lane markers. For example, the lane marker refiner 126 may apply a fitting to the one or more lane markers. A fitting may be used for generating a parametric form (e.g., a line or a curve) from a number of data points. The process of fitting points to a parametric form may also be referred to as line fitting or curve fitting. As used herein, the term "apply a fitting" refers to generating a parametric form that fits a number of lane marker points.

The one or more lane markers generated by the straight lane-marker clusterer 124 may include a number of points. The lane marker refiner 126 may construct a line or curve that fits the lane marker points generated by the straight lane-marker clusterer 124. In an approach, the lane marker refiner 126 may use a smooth function that approximately fits the lane marker points.

A polynomial equation may be used to generate the parametric form (e.g., a line or a curve) that fits the lane marker points. For example a first degree polynomial equation may be used to generate a straight line. A higher degree (e.g., second, third, etc.) polynomial equation may be used to generate a curve that fits the lane marker points.

In another example, the lane marker refiner 126 may optimize a score function to obtain the one or more lane markers. The score function is an objective function. In an implementation, the score function may have a constraint (or objective) that lanes should be smooth and the lane responses of lane following should be maximized. Optimizing the score function includes maximizing the score function or determining a highest score for the score function. Optimizing this score function results in a smooth lane with large lane responses. To optimize the score function, one or more optimization methods may be used. For example, dynamic programming may be used. An example of lane marker refinement is described in connection with FIG. 12.

In an implementation, the electronic device 102 may first determine an ego-lane mask for an image before estimating the one or more lane markers. An ego-lane mask generator 128 may determine an ego-lane mask for a given image. This may reduce the search regions of a lane marker. As used herein, an ego lane is a lane in which a vehicle is positioned. Therefore, the ego-lane mask restricts the lane marker search region to an area of the image in which the vehicle resides.

In the IPM domain, lanes tend to have some special characteristics. For example, straight lanes in the image domain often have a perpendicular line shape and parallel lanes are equidistance between lanes. Based on these characteristics, the ego-lane mask generator 128 may make an effective ego-lane mask. For example, from the camera center as a reference point, the ego-lane mask generator 128 can define a rectangular area in the IPM domain in which the vehicle is likely to occupy. Based on the ego-lane mask, the electronic device 102 can obtain speed gains by restricting the search regions to those regions in an image that the vehicle is likely to move.

The ego-lane mask may be applied to the image. The lane marker estimator 118 may then estimate one or more lane markers based on the masked image. An example of the ego-lane mask generation is described in connection with FIG. 13.

The memory 106 may store instructions and/or data. The processor 104 may access (e.g., read from and/or write to) the memory 106. The memory 106 may store the images and/or instruction codes for performing operations by the processor 104. The memory 106 may be any electronic component capable of storing electronic information. The memory 106 may be embodied as random access memory (RAM), read-only memory (ROM), magnetic disk storage media, optical storage media, flash memory devices in RAM, on-board memory included with the processor 104, erasable programmable read-only memory (EPROM), electrically erasable programmable read-only memory (EEPROM) memory, registers, and so forth, including combinations thereof.

Data and/or instructions may be stored in the memory 106. The instructions may be executable by the processor 104 to implement one or more of the methods described herein. Executing the instructions may involve the use of the data stored in the memory 106. When the processor 104 executes the instructions, various portions of the instructions may be loaded onto the processor 104, and various pieces of data may be loaded onto the processor 104.

It should be noted that one or more of the elements or components of the electronic device 102 may be combined and/or divided. It should be noted that one or more of the elements or components described in connection with FIG. 1 may optional.

Figure 2:
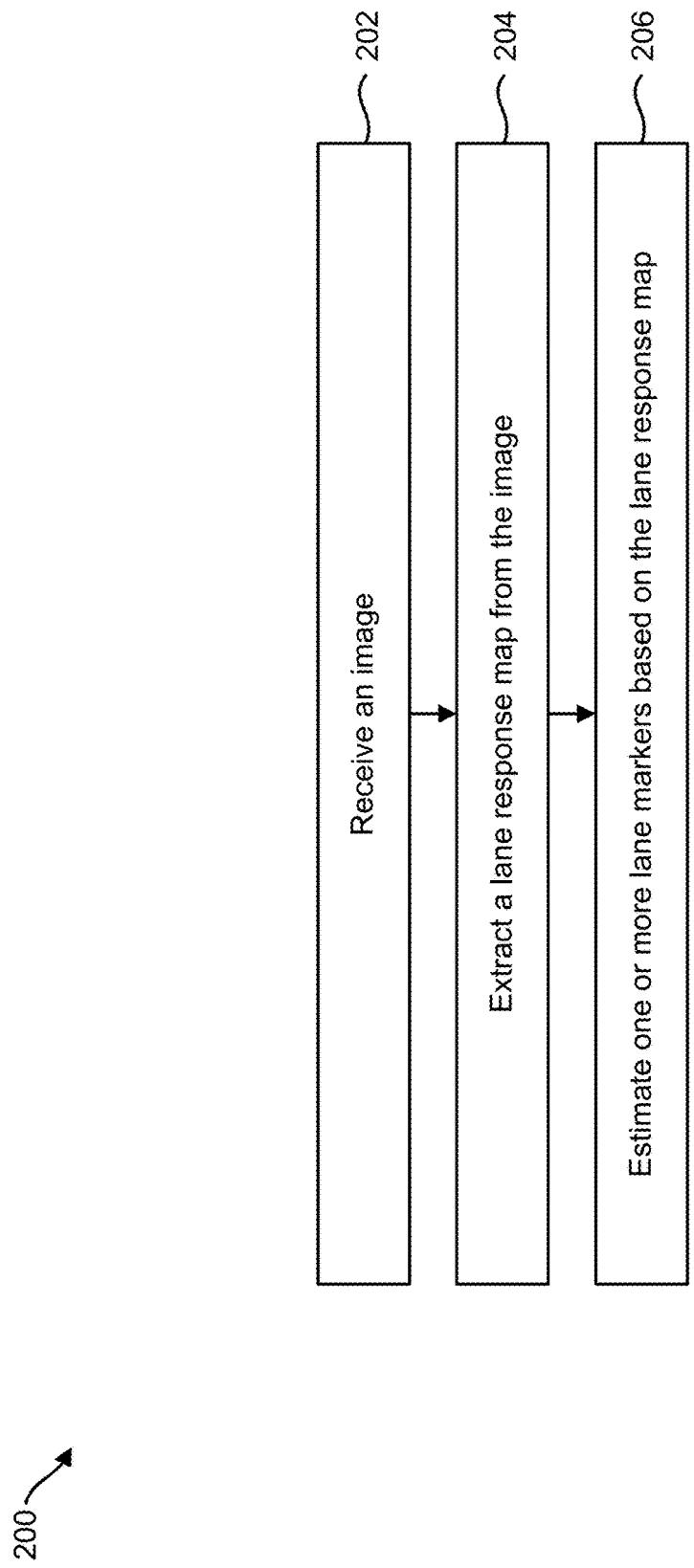
FIG. 2 is a flow diagram illustrating one configuration of a method for lane-marker detection.

FIG. 2 is a flow diagram illustrating one configuration of a method 200 for lane-marker detection. The method 200 may be performed by one or more of the electronic devices 102 described herein.

The electronic device 102 may receive 202 an image. For example, the electronic device 102 may be configured with a camera. The camera may capture one or more images (e.g., digital images, image frames, video, etc.).

The electronic device 102 may extract 204 a lane response map from the image. For example, the electronic device 102 may perform row-wise one-dimensional (1D) filtering on the image. This may be accomplished as described in connection with FIG. 7.

The electronic device 102 may estimate 206 one or more lane markers based on the lane response map. For example, the electronic device 102 may select a high response map that is greater than a predefined threshold for further lane-marker detection. The electronic device 102 may transform the pixels in the lane response map with a high response to an inverse-perspective-mapping (IPM) domain.

In an implementation, the electronic device 102 may define one or more sections in the image. The one or more sections may be defined based on a lane-marker segment width assumption, a pre-defined detection distance range, and/or calibration data.

The electronic device 102 may detect one or more straight lane-marker segments in each of the one or more sections. For example, after transforming the lane response map to the IPM domain, the electronic device 102 may perform a transform in each of the one or more sections. In an implementation, the transform may be a Radon transform. The electronic device 102 may obtain a lane-marker position and a lane-marker orientation based on the transform.

The electronic device 102 may cluster the one or more straight lane-marker segments to obtain one or more lane markers. In an implementation, the electronic device 102 may use a DBSCAN to cluster the one or more straight lane-marker segments into a lane marker.

Figure 3:
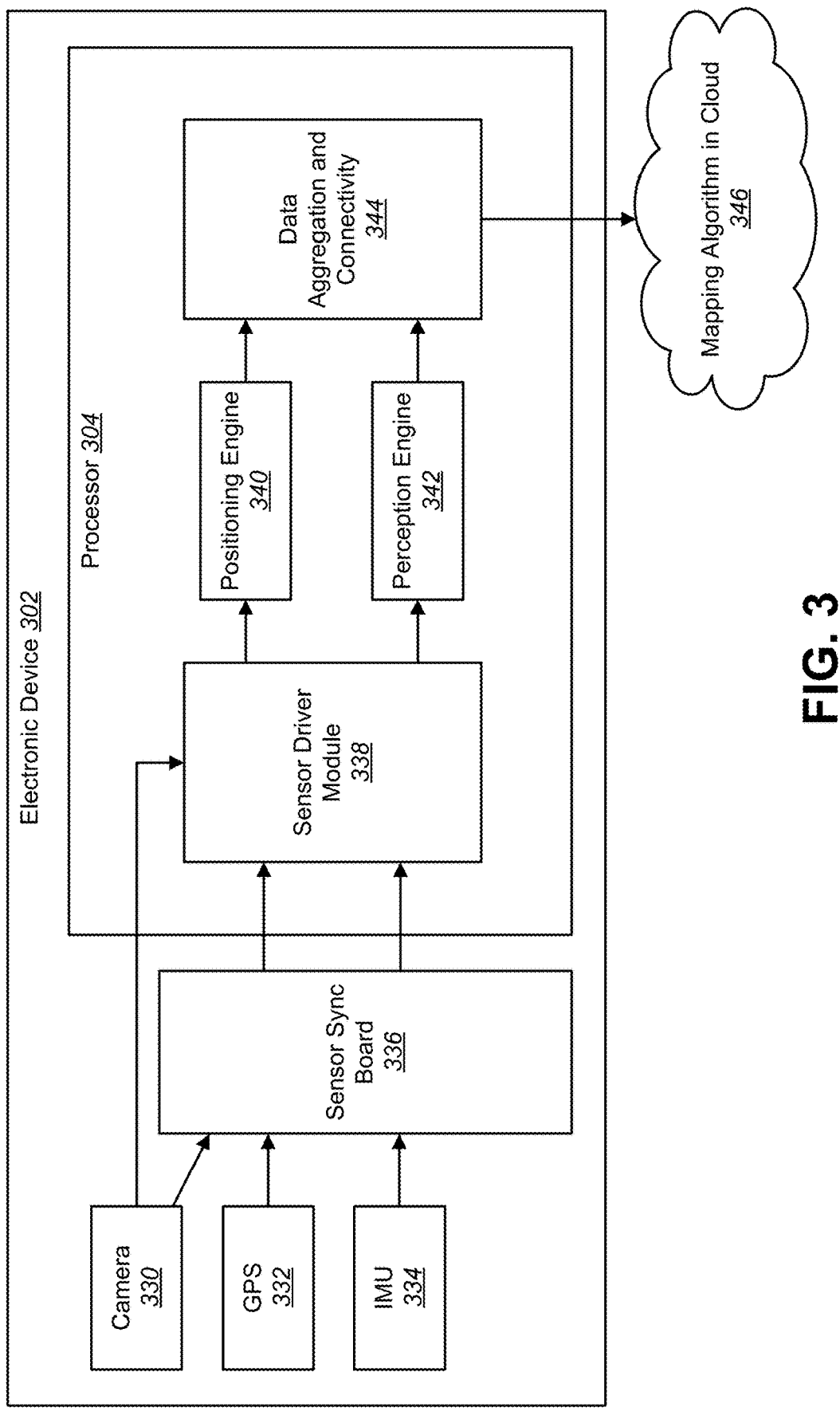
FIG. 3 is a block diagram illustrating one example of an electronic device in which lane-marker detection may be implemented.

FIG. 3 is a block diagram illustrating one example of an electronic device 302 in which lane-marker detection may be implemented. The electronic device 302 may describe a precise positioning and mapping platform (PPMP). The PPMP may provide precise positioning and mapping capability with a set of economically viable sensors, and edge processing and analytics capabilities. Mapping algorithms 346 in the cloud may detect and localize key landmarks to generate precise localization maps. The PPMP may be used to provide the precise position of a moving vehicle (e.g., an automobile).

The system may include a camera 330, a global positioning system (GPS) receiver 332, an inertia sensor (IMU) 334, a sensor synchronization board 336, and a processor 304. The processor 304 may include a sensor driver module 338, a positioning engine 340, a perception engine 342, and a data aggregation and connectivity module 344.

The processor 304 may communicate with one or more devices over a wireless or wired network. The one or more devices may perform a mapping algorithm 346.

The front-end sensors 108 of FIG. 1 (e.g., the camera 330, GPS receiver 332, and IMU 334 in FIG. 3) may be consumer-grade sensors. The sensor synchronization board 336 may include an embedded microcontroller that controls time stamps of all sensors 108. In an implementation, the sensor synchronization board 336 may generate time stamps with less than 10 microseconds timing error.

The output of the camera 330, GPS receiver 332, and IMU 334 may be fed into both the positioning engine 340 and the perception engine 342. The perception engine 342 may detect key landmarks (e.g., lane-markers) in the incoming video stream and localize them accurately in the image frames. The positioning engine 340 may provide accurate estimates of camera poses in six degrees of freedom (6DoF) by tightly fusing the GPS signal, inertial sensor readings, and camera video inputs.

The outputs of the positioning engine 340 and the perception engine 342 may be aggregated and sent to the cloud via the data aggregation and connectivity module 344. The mapping algorithm 346 may generate the location estimate of the landmarks in the global frame, where the global frame includes an entire map or a large part of a map.

FIG. 4 illustrates some examples of challenges of current lane-marker detection systems and methods. Lane markers 451a-b may be landmarks used to detect and localize in the perception engine for PPMP. Lane-marker detection (LMD) for PPMP may accurately and robustly localize lane markers in real time. In contrast, in some existing systems, LMD may be used to provide lanes for as long as possible for the purpose of advanced driver assistance systems (ADAS) and autonomous driving (AD). Existing systems may be too slow in terms of frame rate and lack robustness.

In the two examples (a) and (b) shown in FIG. 4, the LMD generated over-exaggerated lane marker estimations 452a-b. These curves do not accurately define the lane markers 451a-b, which results in a lack of robustness. This over-exaggeration of the lane markers 451 is due to heavy dependence on spline model fitting. The systems and methods described herein resolve this problem, providing a fast and robust lane-marker detection.

Figure 5:
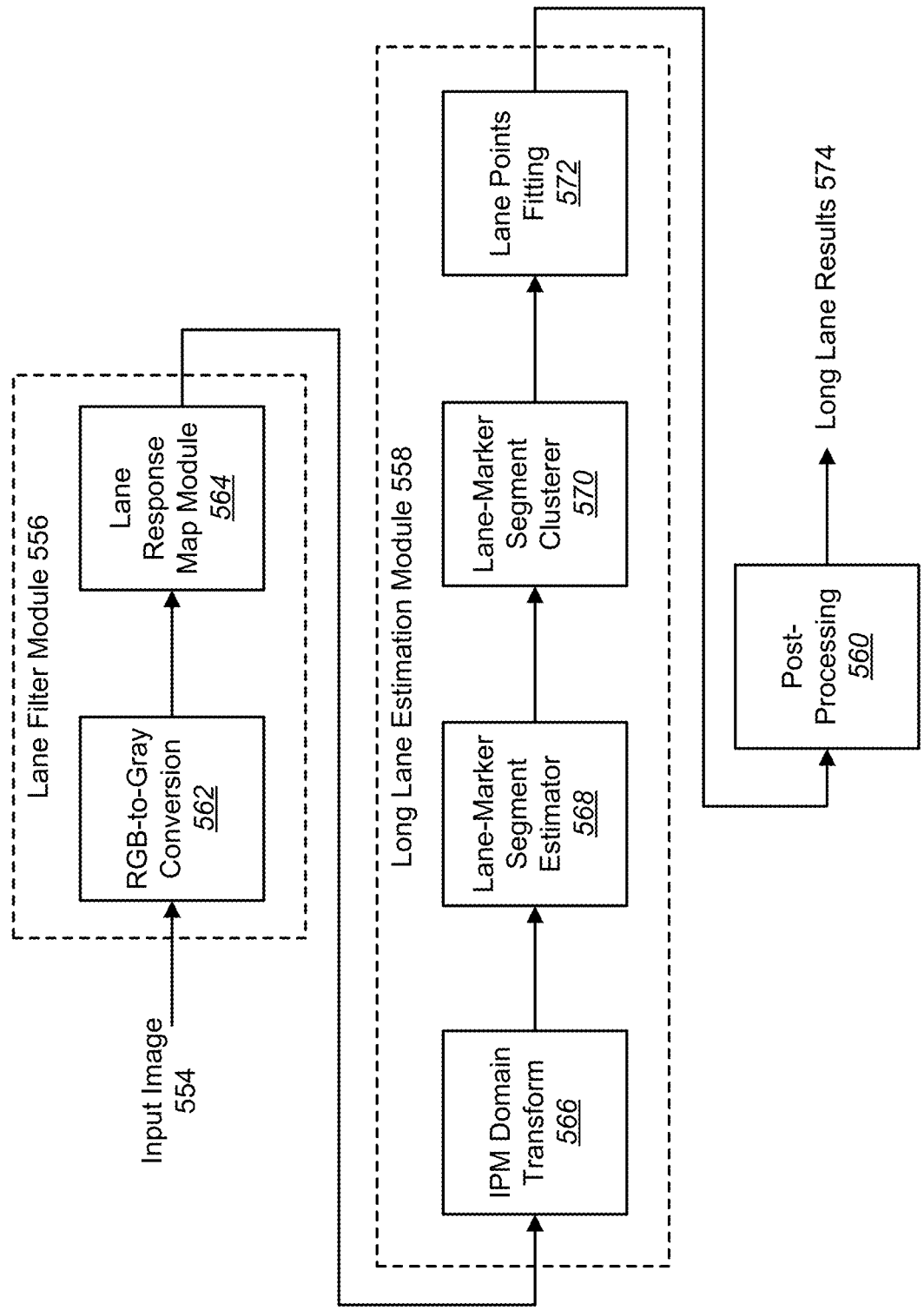
FIG. 5 is a block diagram illustrating one example of a lane-marker detection system.

FIG. 5 is a block diagram illustrating one example of a lane-marker detection system. The lane-marker detection system may be implemented by an electronic device 102 of FIG. 1.

An input image 554 may be received at a lane filter module 556. The input image 554 may be provided to an RGB-to-grayscale (rgb2gray) conversion module 562. The input image 554 may be converted from an RGB color model to a grayscale color model. This may be accomplished as described in connection with FIG. 6.

The converted image may be provided to a lane response map module 564, which extracts a lane response map from the converted image. The lane response map may be generated using 1D filtering, as described in connection with FIG. 7.

A long lane estimation module 558 may estimate one or more lane markers in the input image 554 based on the lane response map. The long lane estimation module 558 may include an inverse-perspective-mapping (IPM) domain transform module 566. The IPM domain transform module 566 may transform the lane response map to the IPM domain. This may be accomplished as described in connection with FIG. 8.

In an implementation, the IPM domain transform module 566 may select a high response map that is greater than a predefined threshold. Selecting the high response map may include selecting a subset of pixels in an input image 554 corresponding to the high response map. The IPM domain transform module 566 may transform only these pixels to the IPM domain.

A lane-marker segment estimator 568 may estimate one or more lane-marker segments in the input image 554. Lane segment estimation may assume that any lane can be modeled by concatenating several line segments. The lane-marker segment estimator 568 may divide the input image 554 into one or more sections. Lane segment estimation may also assume that the lane is modeled by a straight line such that lane detection is done in each section and the detected lanes are clustered to form a long lane. The lane-marker segment estimator 568 may then detect one or more straight lane-marker segments in each of the one or more sections. This may be accomplished as described in connection with FIG. 9 and FIG. 10.

In an implementation, the lane-marker segment estimator 568 may filter the detected lane-marker segments using image statistics. For example, the lane-marker segment estimator 568 may use gradients and image statistics to reduce false positives in the detected lane-marker segments. False positives may include detecting lane markers in non-lane regions. For example, false positives may include incorrect lane detections in a wooded area, water body, etc. This filtering may be accomplished as described in connection with FIG. 11.

A lane-marker segment clusterer 570 may cluster the estimated lane-marker segments. In an implementation, the lane-marker segment clusterer 570 may use a density-based clustering algorithm to obtain a clustering of the lane-marker segments. This may be accomplished as described in connection with FIG. 12.

A lane points fitting module 572 may apply a fitting to lane marker points. For example, a polynomial fitting may be applied to the final lane candidates to obtain a smoother result. In one example, the lane points fitting module 572 may use a random sample consensus (RANSAC)-based fitting. In an implementation, the lane points fitting module 572 may perform a RANSAC-based fitting from a first degree polynomial equation (e.g., line) to a third degree polynomial equation (e.g., cubic) to find a curve that best fits the lane marker points. In many cases, the 3rd parametric model (cubic) provides smoother results than a line. The lane points fitting module 572 may perform the RANSAC-based fitting until inlier constraints are met, where the inliers are points that approximately can be fitted to a line. By using a robust fitting method, outliers (e.g., points which cannot be fitted to the line or curve) may also be rejected.

A post-processing module 560 may further remove false positives in the detected lane markers. False positives may be detected using a gradient threshold and/or classifiers corresponding to various image features.

The long lane results 574 that are generated by the post-processing module 560 may include a plurality of points defining each lane marker. In other words, a lane marker may be defined by a curve containing more than two points.

Figure 6:
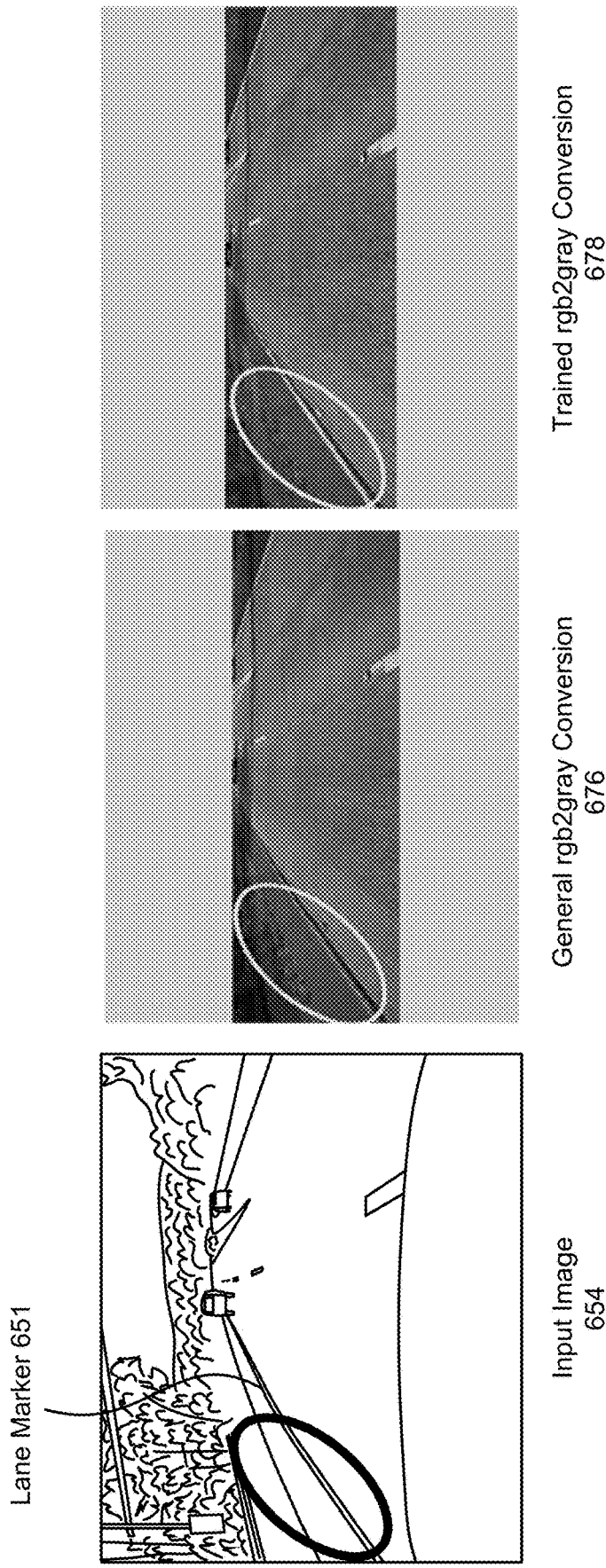
FIG. 6 is an example illustrating a color model conversion.

FIG. 6 is an example illustrating a color model conversion. If a general RGB-to-grayscale (rgb2gray) conversion 676 is used, yellow and/or orange lane markers may lose visual distinctiveness between a lane marker 651 and the road, as illustrated in the input image 654 and the general rgb2gray conversion 676 of FIG. 6. In some configurations, a trained projection model may be adopted to maximize the intensity distances using linear discriminant analysis. For example, the trained projection model may maximize the intensity distances between white and the road color or between yellow and the road color. A trained RGB-to-grayscale conversion 678 may retain visual distinctiveness as illustrated in the trained rgb2gray conversion 678 of FIG. 6.

Figure 7:
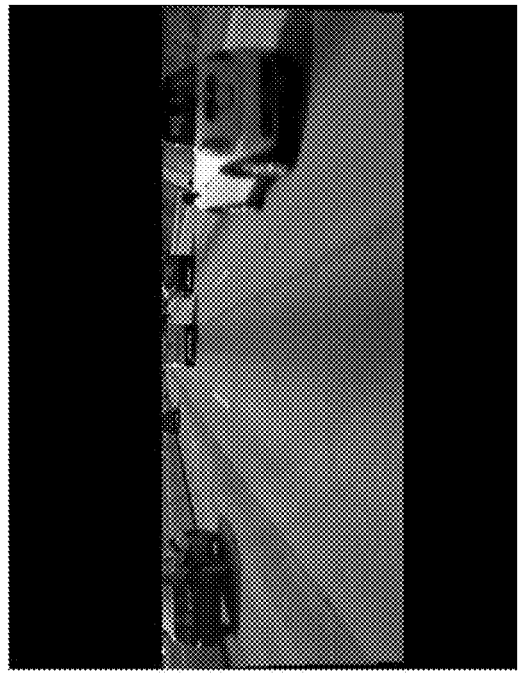
FIG. 7 is an example illustrating lane response map extraction.
Figure 7:
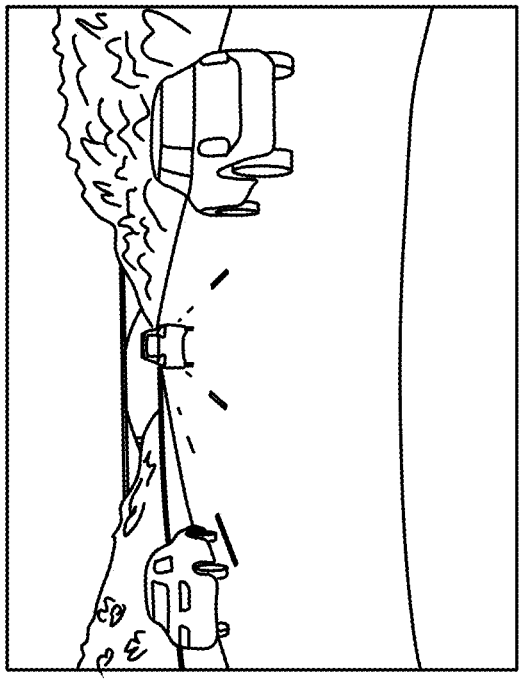
Figure 7:

FIG. 7 is an example illustrating lane response map extraction. The electronic device 102 may extract a lane response map 782 from an input image 754. In one configuration, the electronic device 102 may use row-wise one-dimensional (1D) filtering based on Equation (1).

$$y_i = 2x_i - (x_{i-\tau} + x_{i+\tau}) - |x_{i-\tau} + x_{i+\tau}|. \quad (1)$$

As described above, in Equation (1), $x_i$ indicates the value of an image at position i, and $\tau$ is a pre-defined width for calculating the lane response value $y_i$. FIG. 7 shows an original input image 754, a matched filter 780 applied to the input image 754, and the lane response map 782 obtained by applying a row-wise 1D filter to the input image 754. As used herein, a matched filter 780 is a general approach to signal processing. In the systems and methods described herein, a matched filter 780 may be implemented using a row-wise one-dimensional filter. In other words, the row-wise one-dimensional filter may be a unique implementation of a matched filter 780.

Figure 8:
FIG. 8 is an example illustrating an inverse-perspective-mapping (IPM) domain transform from a lane response map of an input image.
Figure 8:
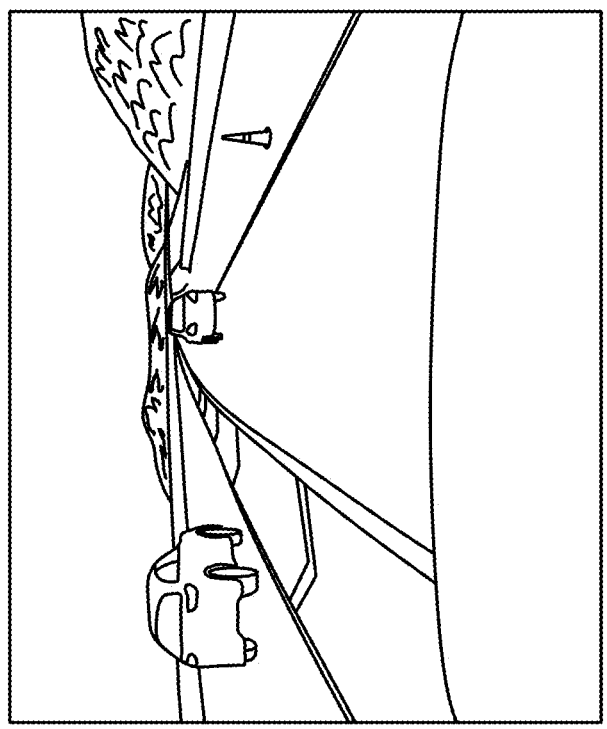

FIG. 8 is an example illustrating an inverse-perspective-mapping (IPM) domain 884 transform generated from a lane response map of an input image 854. In one configuration, the lane response map 782 of FIG. 7 may be transformed to a lane response map in the IPM domain 884. The lane markers may be reconstructed in three dimensions (3D) using a plane assumption (i.e., a flat road assumption) according to Equation (2).

$$x = T_p T_A T_{trs} X \quad (2)$$

In Equation (2), the translation variable $T_{trs}$ may be defined according to Equation (3), where $cam_{height}$ is the height of the camera.

$$T_{trs} = \begin{pmatrix} 1 & 0 & 0 & 0 \\ 0 & 1 & 0 & 0 \\ 0 & 0 & 1 & cam_{height} \\ 0 & 0 & 0 & 1 \end{pmatrix} \quad (3)$$

A first rotation variable $T_A$ to align the Z direction (i.e., forward direction) may be defined according to Equation (4).

$$T_A = \begin{pmatrix} 1 & 0 & 0 & 0 \\ 0 & 0 & -1 & 0 \\ 0 & 1 & 0 & 0 \\ 0 & 0 & 0 & 1 \end{pmatrix} \quad (4)$$

A second rotation variable $T_P$ to account for pitch rotation ($\phi$) of the camera in the x direction (i.e., lateral direction) may be defined according to Equation (5).

$$T_P = \begin{pmatrix} 1 & 0 & 0 & 0 \\ 0 & \cos\phi & -1\sin\phi & 0 \\ 0 & \sin\phi & \cos\phi & 0 \\ 0 & 0 & 0 & 1 \end{pmatrix} \quad (5)$$

The three terms $T_P T_A T_{trs}$ may be referred to as $H_{Road2Image}$, which is a 3×3 homography. In Equation (2), X may be defined according to Equation (6), where $X_w$, $Y_w$ and $Z_w$ are coordinates in the world frame centered at the camera optical center.

$$X = \begin{pmatrix} X_w \\ Y_w \\ Z_w = 0 \\ 1 \end{pmatrix} \quad (6)$$

In Equation (6), $X_w$ is the lateral (left/right) dimension centered at the camera lens, $Y_w$ is the vertical (up/down) dimension centered at the camera lens and $Z_w$ is the depth (forward/backward) dimension centered at the camera lens. An example of the coordinate system used herein is described in connection with FIG. 17. It should be noted that by setting $Z_w$ as 0 in Equation (6), the camera may be located right above ground, which makes the IPM domain 884 a birds-eye-view. The final calculation result of the homography is ($X_w$, $-Z_w-cam_{height}$, $Y_w$). By setting $Z_w$ as 0, the final y position is $-cam_{height}$, which is the ground position (i.e., y=0) relative to the camera. It should also be noted that the final "1" in Equation (6) corresponds to the notation from conventional homogeneous coordinates.

The term x may be defined according to Equation (7), where u is a horizontal location in the input image 854 and v is a vertical location in the input image 854.

$$x = \begin{pmatrix} u \\ v \\ 1 \end{pmatrix} \quad (7)$$

By using Equations 2-7, the lane response map 782 of FIG. 7 may be transformed to a lane response map in the IPM domain 884. For example, a lane response map may be determined from the input image 854 as described in connection with FIG. 7. The values of the lane response map may then be transformed to the IPM domain according to Equations 2-7. Furthermore, points in the IPM domain may be transformed back to the image domain according to Equations 2-7.

Figure 9:
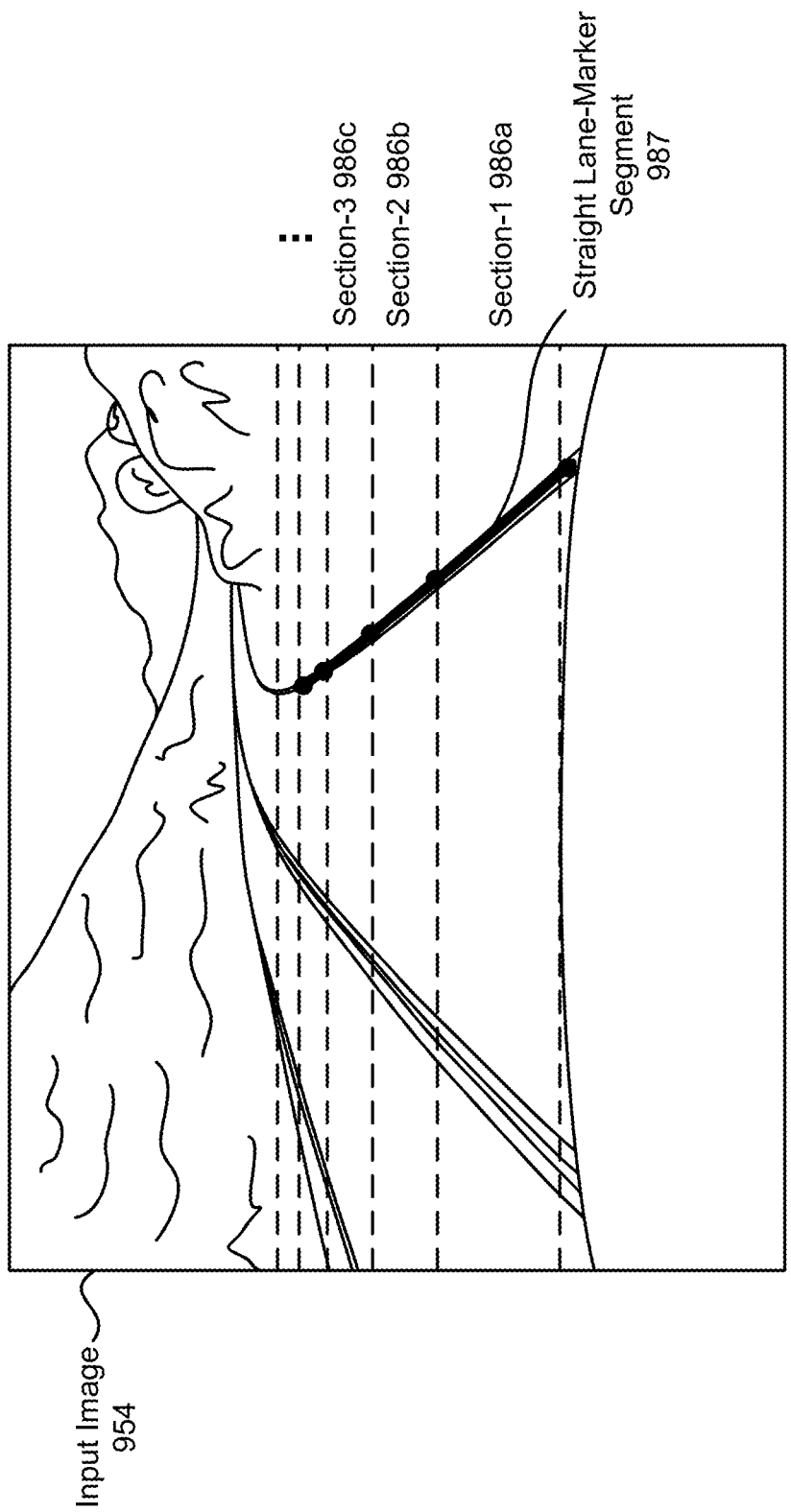
FIG. 9 shows an example of lane-marker segment estimation used in lane-marker detection.

FIG. 9 shows an example of lane-marker segment estimation used in lane-marker detection. In an approach, any lane having an arbitrary shape may be approximated by concatenating several straight-line segments 987. An estimation of lane-marker segments 987 may assume that a lane in a section 986 of the input image 954 can be modeled by a straight line. The estimation may also assume that lane detection can be done in each section 986a-c by detecting straight-line segments 987 in a section 986 and by clustering the detected straight-line segments 987 to be a long lane (which may model an arbitrary shape).

The input image 954 may be divided into sections 986a-c. The lane-marker segment estimation may define the sections 986 based on one or a combination of a lane stripe width assumption, a pre-defined detection distance range, and/or calibration data. FIG. 9 illustrates an input image 954 with a first section 986a, a second section 986b, a third section 986c and so forth.

In an implementation, the sections 986 may be defined using calibration data. A stripe width of a lane ($l_w$) (also referred to as lane marker width or stripe width) may be defined in a configuration file that is pre-stored in memory. In an implementation, the stripe width $l_w$ in the IPM domain may have a value of 0.15 meters.

Based on a pre-defined distance range ($d_{range}$) in the IPM domain (e.g., 1-150 meters) with a given distance step (e.g., 2 meters), the projected image domain position of a section 986 may be calculated. The pre-defined distance range may be a search range. The distance step may be the step size used when searching in the distance range. For example, a search may start at 1 meter and then 1+2 meters, 1+2+2 meters, and so forth until the end of the pre-defined distance range. In this case, the lane may be assumed to be in the center of the field of view of the camera 330.

The left projected lane position in the IPM domain ($P_{l_{IPM}}$) may be calculated according to Equation (8), where f is the focal length of the camera.

$$P_{l_{IPM}} = \left( -\frac{l_w}{2}, d_{range}, 1.0f \right) \quad (8)$$

The right projected lane position in the IPM domain ($P_{r_{IPM}}$) may be calculated according to Equation (9).

$$P_{r_{IPM}} = \left( \frac{l_w}{2}, d_{range}, 1.0f \right) \quad (9)$$

The projected lane position in the input image 954 may be determined according to Equations (10) and (11), where $P_{l_{image}}$ is the left projected lane position and $P_{r_{image}}$ is the right projected lane position and M is the inverse matrix of $H_{Road2Image}$.

$$P_{l_{image}} = M_{3\times3} \times P_{l_{IPM}} \quad (10)$$

$$P_{r_{image}} = M_{3\times3} \times P_{r_{IPM}} \quad (11)$$

The sections 986 may be added using the projected lane positions until the projected position is out of range or the difference of a previous section position is not changed in a threshold (e.g., 2 pixels).

In one configuration, the electronic device 102 may divide an image 954 into sections 986 and estimate a set of straight lines in each section 986. The results from each section 986 may be clustered to generate smooth lines. Detecting lane-marker segments 987 in each section 986 may exploit a Radon transform (R(ρ, θ)) of lane filter responses to obtain possible lane positions (ρ) and orientations (θ).

After detecting straight lane-marker segments 987 in each section 986, the results may be clustered using a density-based spatial clustering of applications with noise (DBSCAN). A score function may be defined that is formalized to represent the lane probability and the smoothness of a curve between lanes of each section 986. By optimizing the score function, the lane results may be refined to generate more accurate and smoother results as compared to the unrefined straight lane-marker segments 987 in each section 986 as illustrated in the images in FIG. 9.

In an approach, the electronic device 102 may directly estimate a set of lane points in the input image 954 in the IPM domain. Lane segment estimation may apply a fitting to the set of lane points for smoothing the output of points. For example, a line or curve that fits the set of lane points may be generated using a parametric equation. Lane segment estimation may output a set of points intersecting each section 986. Further details on determining the lane-marker segments 987 are described in connection with FIG. 10.

Figure 10:
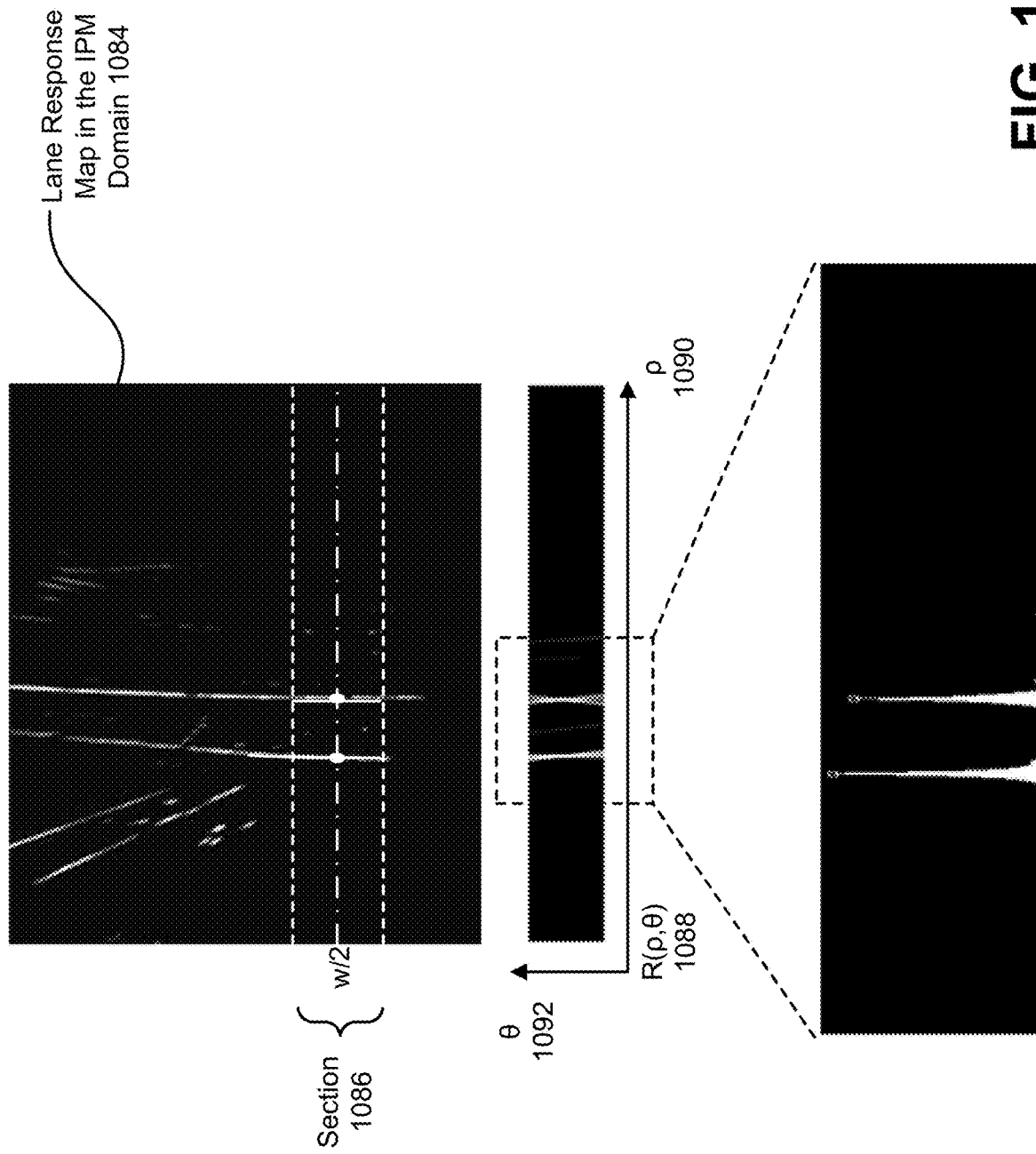
FIG. 10 shows another example of lane-marker segment estimation used in lane-marker detection.

FIG. 10 shows another example of lane-marker segment estimation used in lane-marker detection. In an approach, the lane response map of the input image 954 of FIG. 9 may be converted to the IPM domain 1084. The IPM domain transform may be based on the lane response map 782 of FIG. 7.

In an implementation, after transforming the lane response map 782 of FIG. 7 to the IPM domain 1084, lane-marker segments 987 of FIG. 9 may be detected in each section 1086 by performing a Radon transform 1088 on the lane response in the IPM domain 1084.

The Radon transform (R(ρ,θ)) 1088 may include lane positions (ρ) 1090 and orientations (θ) 1092. The Radon transform (R(ρ,θ)) 1088 may be defined by the line integral along each of the following lines:

$$x \cos\theta - y \sin\theta = \rho. \tag{12}$$

Converting Equation (12) to the image coordinate system results in $$\left(u - \frac{w}{2}\right)\cos\theta - \left(v - \frac{H}{2}\right)\sin\theta = \rho. \tag{13}$$

Equation (13) is a line equation in polar coordinates, where w is the width of an image, H is the height of the image, u is an alternative of x and v is an alternative of y. Care may be taken for lines that pass through a point on the central part of a section $$\left(\frac{w}{2}\right), \text{ where } \left(\frac{H}{2} - k\right)\sin\theta = \rho, (k = 1, \ldots, H, \theta \in [\alpha, \beta]),$$

k is the v alternative in the range from 1 to height H, and [α, β] is the range of angle θ that is relevant.

In one configuration, to detect lane-marker segments 987 of FIG. 9 in each section 1086, the Radon transform 1088 results may be exploited to obtain possible lane positions (ρ) 1090 and orientations (θ) 1092. Assuming ρ 1090 is not severely changed, transform responses may be vertically projected to obtain the highest position of ρ 1090. After finding the local maximum position ($\rho_{localmax}$) the best (θ) 1092 of the lane may be found according to Equation (14).

$$\theta_{best} = \arg\max_\theta R(\tau_{localmax}, \theta). \tag{14}$$

Figure 11:
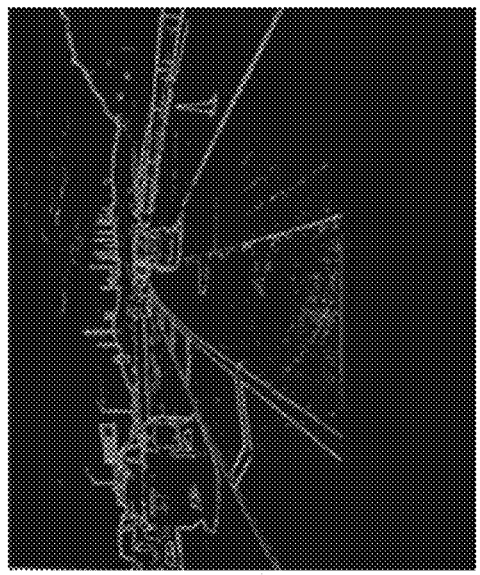
FIG. 11 illustrates filtering detected lane-marker segments using image statistics.
Figure 11:
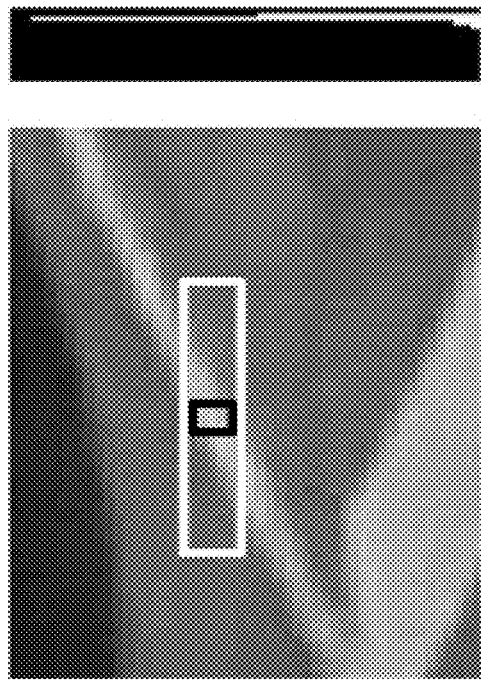
Figure 11:
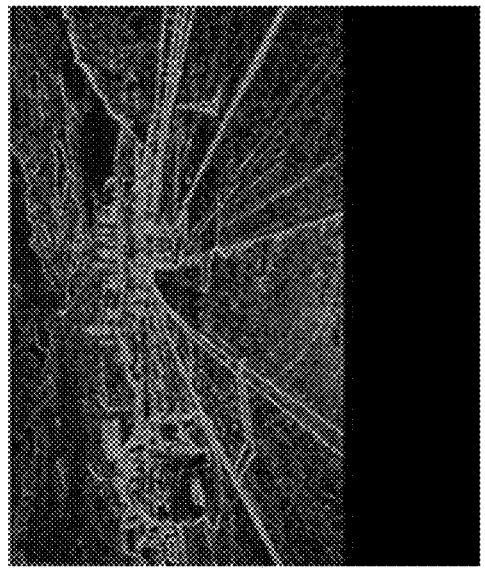

FIG. 11 illustrates filtering detected lane-marker segments using image statistics. In one configuration, detected lane-marker segments may be filtered using image statistics. For example, gradients and image statistics may be used to reduce false positives (FPs). Examples of image statistics include color histogram, gradient histogram, and the statistics of those histograms (e.g., mean, variance, kurtosis, etc.). In the detected lane-marker segments, coherences may be computed by h×w surroundings of a pixel. A 2×n gradient matrix may be computed from the horizontal and vertical gradients. $G_k^T G_k$ and Eigen-values ($\lambda_1^k$, $\lambda_2^k$) may be calculated and a coherence of gradients may be measured by $$\mu_k = \frac{\sqrt{\lambda_1^k} - \sqrt{\lambda_2^k}}{\sqrt{\lambda_1^k} + \sqrt{\lambda_2^k}}.$$

High coherence may generally be an edge-like structure or a series of stripes in the same direction. A kurtosis of a gradients direction histogram (weighted by gradient magnitude) may be used to reject FPs. FIG. 11 shows an input image 1154, a gradient direction image 1194, a gradient norm image 1196 and an example of gradient statistics 1198 with an excessive kurtosis.

The gradient direction image 1194 is the input image 1154 which has projected gradient values in each predefined angle. For example, if the angles of 0-360 degrees are divided by 60 degrees, then there are 6 gradient direction images 1194.

The gradient norm image 1196 is the image having a norm (or weight) of gradients. For example, an L2-norm may be used.

Kurtosis is a measure of the tailedness of probability distribution. For example, a normal distribution has a kurtosis value 3. By comparing the kurtosis of a normal distribution, a determination may be made for whether the distribution has more tailedness characteristics or not. In an implementation, an excessive kurtosis may be defined as a kurtosis of 7.4. However, other kurtosis values may be used to indicate an excessive kurtosis.

Figure 12:
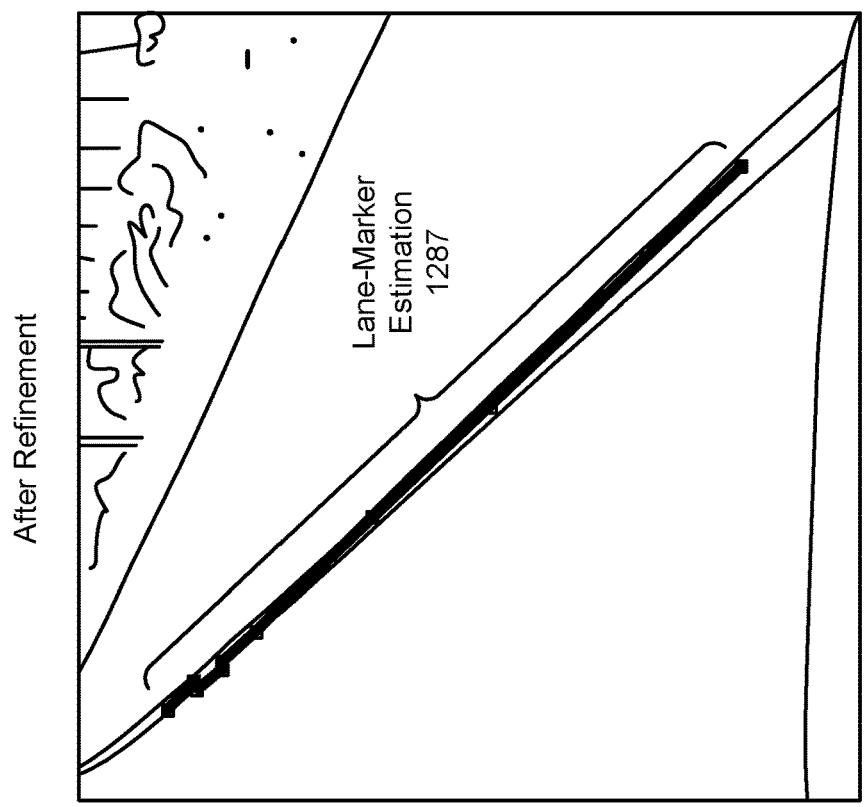
FIG. 12 illustrates an example of clustering estimated lane-marker segments.
Figure 12:
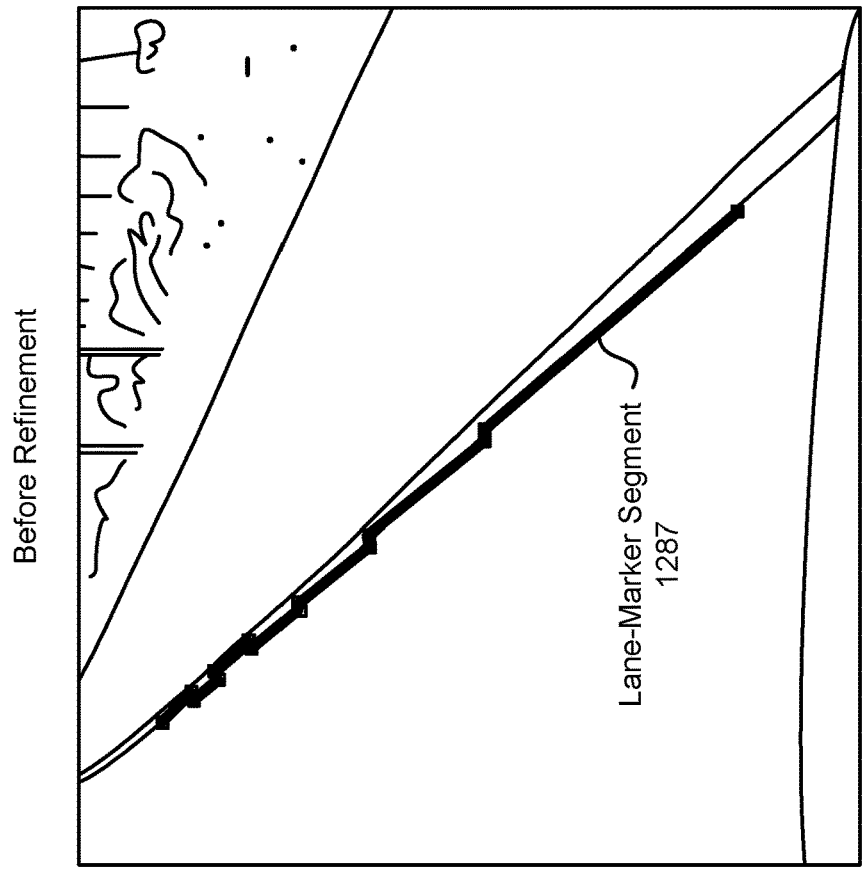

FIG. 12 illustrates an example of clustering and refining estimated lane-marker segments 1287. In one configuration, estimated lane-marker segments 1287 may be clustered. A density-based clustering algorithm (e.g., density-based spatial clustering of applications with noise (DBSCAN)) may be used to obtain initial clustering of lane-marker segments 1287 from various sections 986 of FIG. 9.

After clustering, the results may be refined for improved localization. Multiple candidates that are near (e.g., within a threshold amount) a local maximum may be determined. The best candidate may be found using a global score function. For example, a score function may be defined as:

$$\max_{\rho_1,\theta_1,\ldots,\rho_n,\theta_n} \sum R(k, \theta_k) + \lambda_\theta \phi(\theta_1, \ldots, \theta_n) + \lambda \psi(x_1, x_2, \ldots, x_n). \tag{15}$$

In Equation (15), R(k, $\theta_k$) is the lane responses, φ is the angle of difference measure, ψ is the end point distance measure between lane segments, and $\lambda_\theta$ and λ are regularization terms.

The electronic device 102 may optimize the score function to obtain the one or more lane marker estimations 1287. Dynamic programming may be used to find the global maximum in the lane candidates. FIG. 12 shows an example (a) of lane-marker detection before refinement and an example (b) after refinement.

Figure 13:
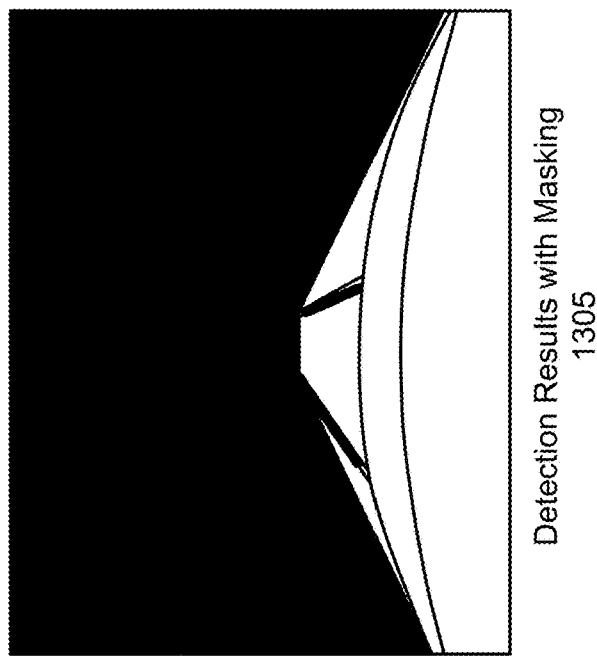
FIG. 13 shows images illustrating lane-marker detection using an ego-lane mask.
Figure 13:
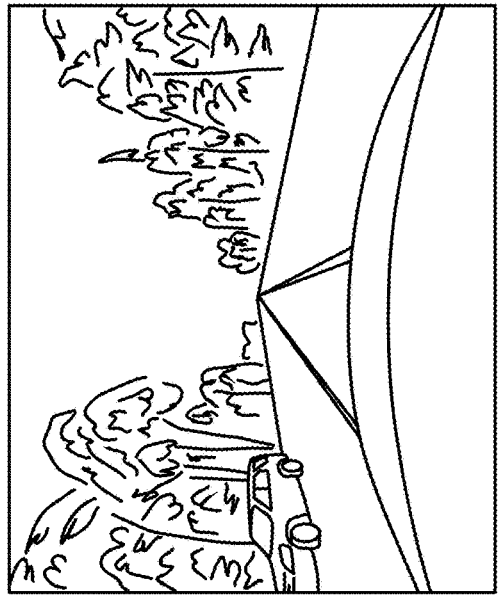
Figure 13:
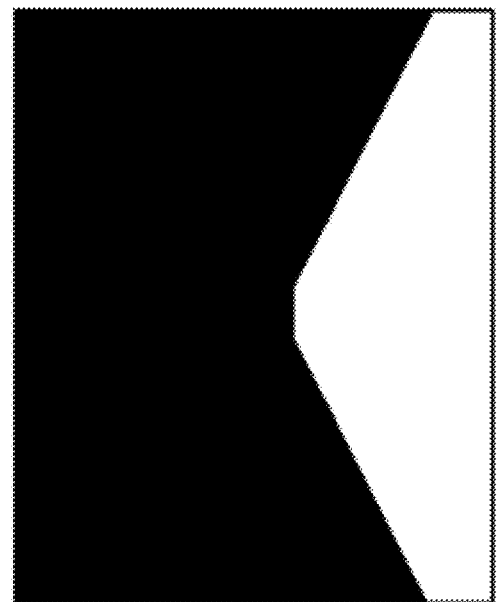

FIG. 13 shows images illustrating lane-marker detection using an ego-lane mask 1303. The ego lane may be a lane (or lanes) in which a vehicle is positioned. In one configuration, search regions for detecting lane markers may be reduced using an ego-lane mask 1303. In the inverse-perspective-mapping (IPM) domain, lane markers may have special characteristics. For example, straight lines in the image domain may have perpendicular line shape and parallel lines may be equidistance between lanes. Based on these characteristics, an ego-lane mask 1303 (also referred to as a lane region mask) may be created.

In an implementation, from the camera center as a reference point, a rectangular area may be defined in the IPM domain. The rectangular area may be the area in which a vehicle is likely to move. In the image domain, the rectangular area may appear as a top-cropped triangle, as illustrated in the white region of the ego-lane mask 1303. In other words, when the rectangular area in the IPM domain is transformed to the image domain, this area may take the shape of a top-cropped triangle. In this example, the black region of the ego-lane mask 1303 is excluded from the lane-marker search. By restricting the lane-marker search region to the area within the ego-lane mask 1303 (e.g., the white region in this example), speed gains may be achieved.

In some configurations, the ego-lane mask 1303 may be used to choose a detection range (i.e., the lane-marker search region). The use of a two-lane mode mask may optimize two-lane mode computation time. FIG. 13 shows an example of an input image 1354 and detection results 1305 applying a two-lane mode ego-lane mask 1303. It should be noted that other lane modes (e.g., one-lane, three-lane, four-lane, etc.) may be used to generate the ego-lane mask 1303.

In an implementation, the ego-lane mask 1303 may be used to optimize image conversion (from RGB to grayscale, for instance) and generating the lane response map 782 of FIG. 7. In this case, image conversion and the lane response map 782 of FIG. 7 will be generated only in the area of the input image 1354 that is within the ego-lane mask 1303.

Figure 14:
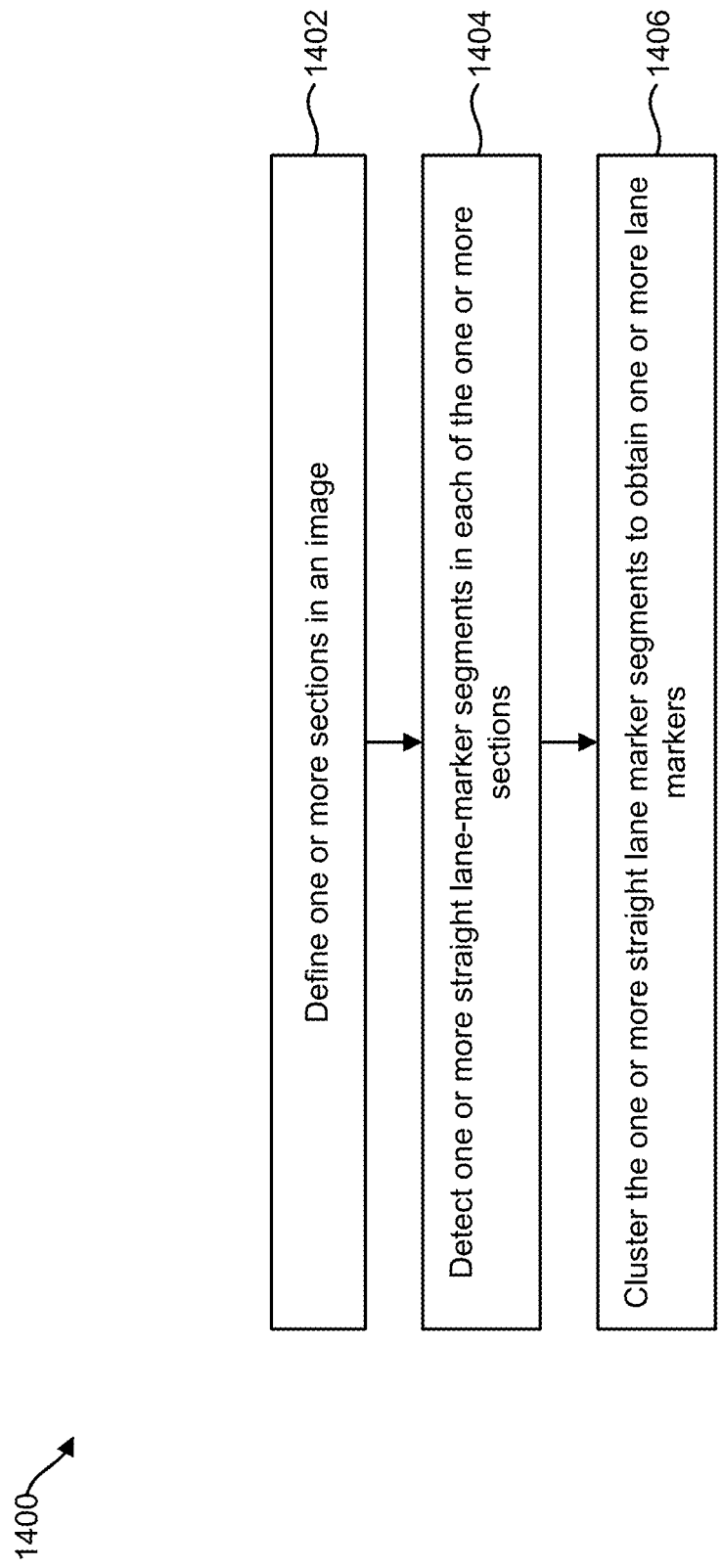
FIG. 14 is a flow diagram illustrating one configuration of a method for estimating one or more lane markers.

FIG. 14 is a flow diagram illustrating one configuration of a method 1400 for estimating one or more lane markers. The method 1400 may be performed by one or more of the electronic devices 102 described herein.

The electronic device 102 may define 1402 one or more sections in an image. An input image may be divided into sections. The electronic device 102 may define 1402 the sections based on a lane stripe width assumption, a pre-defined detection distance range, and/or calibration data.

The electronic device 102 may detect 1404 one or more straight lane-marker segments in each of the one or more sections. In an approach, the lane response map may be transformed to the IPM domain. The electronic device 102 may detect 1404 in each section by performing a Radon transform on the lane response in the IPM domain. In an implementation, the electronic device 102 may filter one or more potential straight line segments to reduce false positives.

The electronic device 102 may cluster 1406 the one or more straight lane-marker segments to obtain one or more lane markers. For example, the electronic device 102 may use a density-based clustering algorithm (e.g., density-based spatial clustering of applications with noise (DBSCAN)) to obtain a clustering of the one or more straight lane-marker segments between the sections. A cluster of straight lane-marker segments may form a lane marker.

Figure 15:
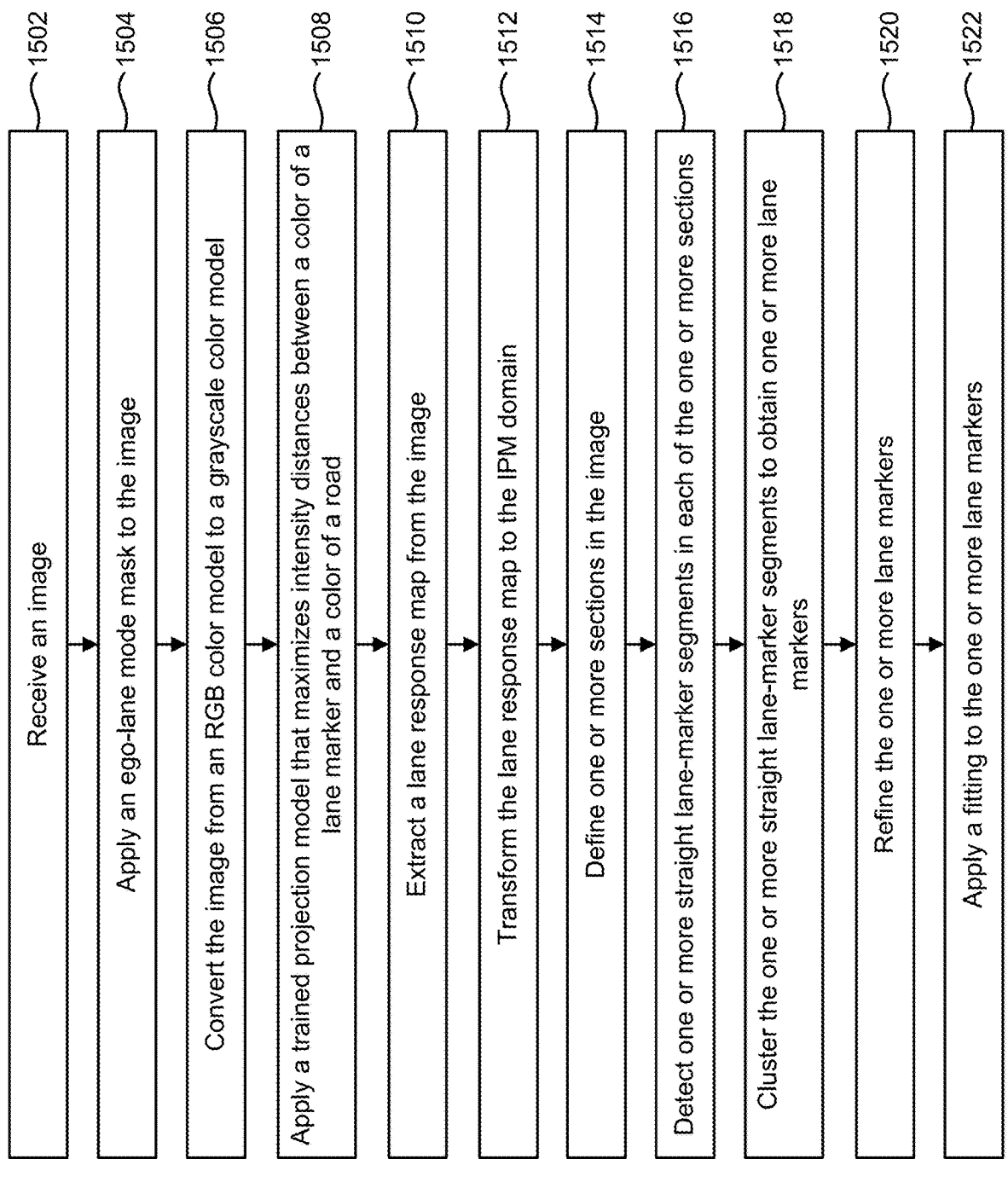
FIG. 15 is a flow diagram illustrating another configuration of a method for estimating one or more lane markers.

FIG. 15 is a flow diagram illustrating another configuration of a method 1500 for estimating one or more lane markers. The method 1500 may be performed by one or more of the electronic devices 102 described herein.

The electronic device 102 may receive 1502 an image. For example, the electronic device 102 may be configured with a camera. The camera may capture one or more images (e.g., digital images, image frames, video, etc.).

The electronic device 102 may apply 1504 an ego-lane mask. For example, the electronic device 102 may generate an ego-lane mask 1303 based on the orientation of the camera and an assumption that lane markers are parallel in the IPM domain. The electronic device 102 may restrict the search region for lane marker detection using the ego-lane mask.

The electronic device 102 may convert 1506 the image from an RGB color model to a grayscale color model. This may be accomplished as described in connection with FIG. 6.

The electronic device 102 may apply 1508 a trained projection model that maximizes intensity distances between a color of a lane marker and a color of a road. For example, the electronic device 102 may use a linear discriminant analysis to maximize the intensity distances. This may increase the contrast between certain colors (e.g., white, orange, yellow) as compared to the road color.

The electronic device 102 may extract 1510 a lane response map from the image. For example, the electronic device 102 may perform row-wise one-dimensional (1D) filtering on the image. This may be accomplished as described in connection with FIG. 7.

The electronic device 102 may transform 1512 the lane response map to the IPM domain. In an implementation, the electronic device 102 may select a high response map that is more than a predefined threshold. The electronic device 102 may only transform these pixels to the IPM domain.

The electronic device 102 may define 1514 one or more sections in the image. The electronic device 102 may define 1514 the sections based on a lane stripe width assumption, a pre-defined detection distance range, and/or calibration data.

The electronic device 102 may detect 1516 one or more straight lane-marker segments in each of the one or more sections. The electronic device 102 may detect 1516 in each section by performing a Radon transform on the lane response in the IPM domain. In an implementation, the electronic device 102 may filter one or more potential straight line segments to reduce false positives. This may be accomplished using gradients and image statistics, as described in connection with FIG. 11.

The electronic device 102 may cluster 1518 the one or more straight lane-marker segments to obtain one or more lane markers. For example, the electronic device 102 may use a density-based clustering algorithm (e.g., density-based spatial clustering of applications with noise (DBSCAN)) to obtain a clustering of the one or more straight lane-marker segments between the sections. A cluster of straight lane-marker segments may form a lane marker.

The electronic device 102 may refine 1520 the one or more lane markers. For example, the electronic device 102 may optimize a score function to obtain the one or more lane markers.

The electronic device 102 may apply 1522 a fitting to the one or more lane markers. For example, a polynomial fitting may be applied to the final lane candidates to obtain a smoother result. In one example, the electronic device 102 may use a random sample consensus (RANSAC)-based fitting from the 1st (line) to 3rd (cubic) to find a best fit until inlier constraints are met.

Figure 16:
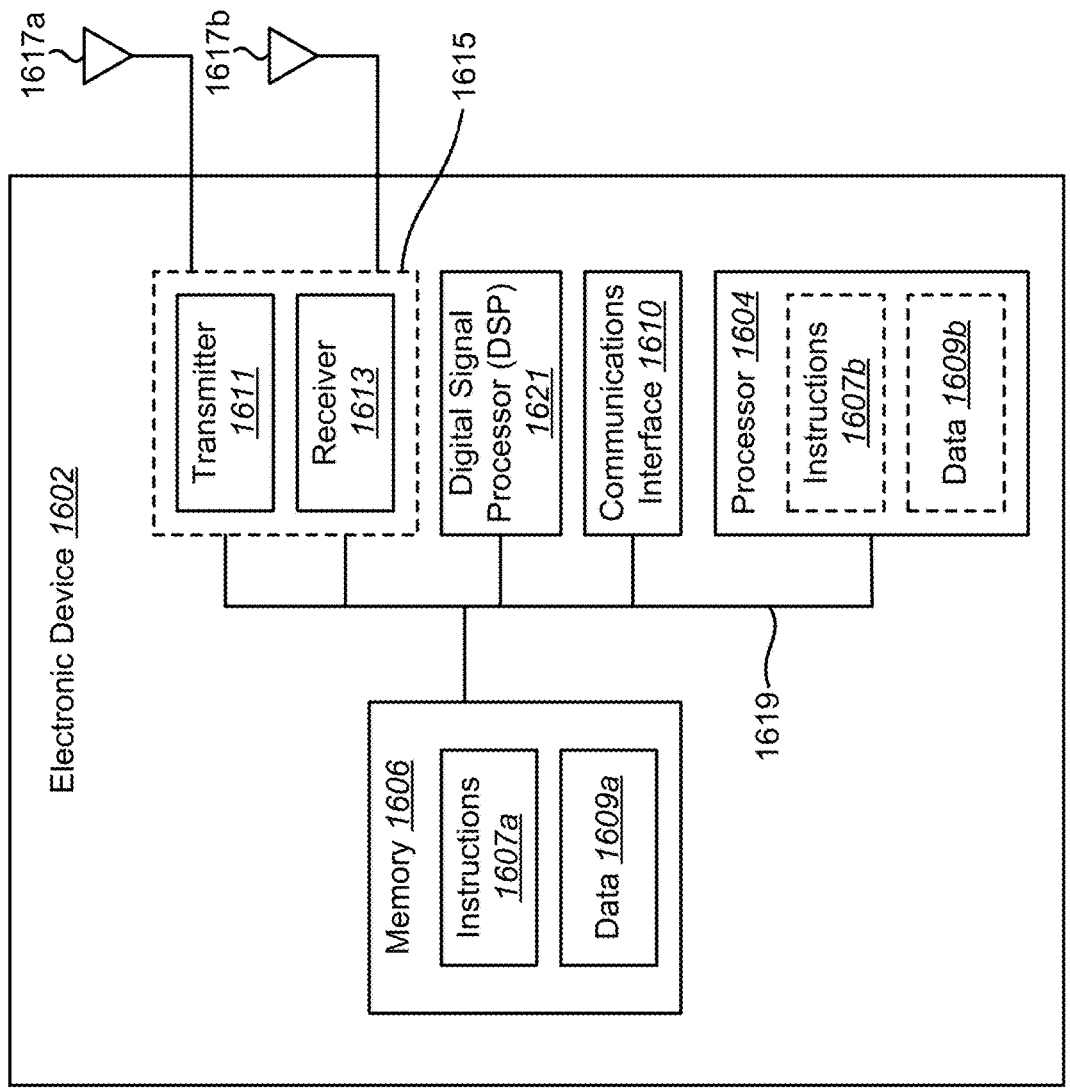
FIG. 16 illustrates certain components that may be included within an electronic device configured to implement various configurations of the systems and methods disclosed herein.

FIG. 16 illustrates certain components that may be included within an electronic device 1602 configured to implement various configurations of the systems and methods disclosed herein. Examples of the electronic device 1602 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The electronic device 1602 may be implemented in accordance with one or more of the electronic devices 102 described herein.

The electronic device 1602 includes a processor 1604. The processor 1604 may be a general-purpose single- or multi-chip microprocessor (e.g., an ARM), a special-purpose microprocessor (e.g., a digital signal processor (DSP)), a microcontroller, a programmable gate array, etc. The processor 1604 may be referred to as a central processing unit (CPU). Although just a single processor 1604 is shown in the electronic device 1602, in an alternative configuration, a combination of processors (e.g., an ARM and DSP) could be implemented.

The electronic device 1602 also includes memory 1606. The memory 1606 may be any electronic component capable of storing electronic information. The memory 1606 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1609a and instructions 1607a may be stored in the memory 1606. The instructions 1607a may be executable by the processor 1604 to implement one or more of the methods, procedures, steps, and/or functions described herein. Executing the instructions 1607a may involve the use of the data 1609a that is stored in the memory 1606. When the processor 1604 executes the instructions 1607, various portions of the instructions 1607b may be loaded onto the processor 1604 and/or various pieces of data 1609b may be loaded onto the processor 1604.

The electronic device 1602 may also include a transmitter 1611 and/or a receiver 1613 to allow transmission and reception of signals to and from the electronic device 1602. The transmitter 1611 and receiver 1613 may be collectively referred to as a transceiver 1615. One or more antennas 1617a-b may be electrically coupled to the transceiver 1615. The electronic device 1602 may also include (not shown) multiple transmitters, multiple receivers, multiple transceivers and/or additional antennas.

The electronic device 1602 may include a digital signal processor (DSP) 1621. The electronic device 1602 may also include a communications interface 1610. The communications interface 1610 may allow and/or enable one or more kinds of input and/or output. For example, the communications interface 1610 may include one or more ports and/or communication devices for linking other devices to the electronic device 1602. In some configurations, the communications interface 1610 may include the transmitter 1611, the receiver 1613, or both (e.g., the transceiver 1615). Additionally or alternatively, the communications interface 1610 may include one or more other interfaces (e.g., touchscreen, keypad, keyboard, microphone, camera, etc.). For example, the communication interface 1610 may enable a user to interact with the electronic device 1602.

The various components of the electronic device 1602 may be coupled together by one or more buses, which may include a power bus, a control signal bus, a status signal bus, a data bus, etc. For the sake of clarity, the various buses are illustrated in FIG. 16 as a bus system 1619.

Figure 17:
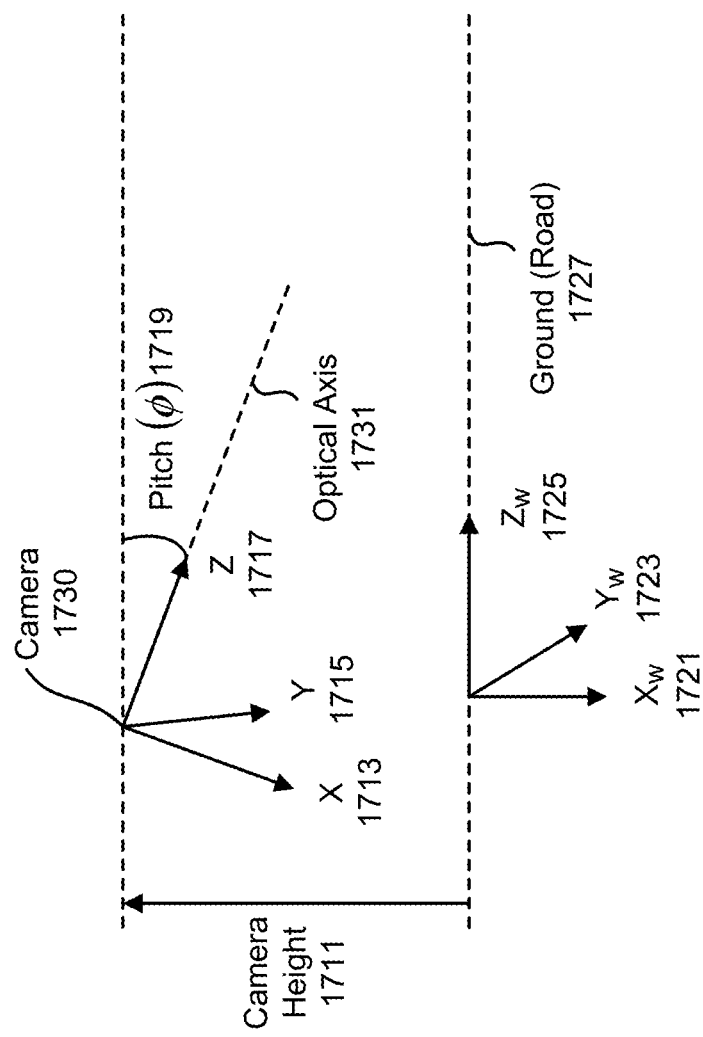
FIG. 17 illustrates an example of a coordinate system used herein.

FIG. 17 illustrates an example of a coordinate system used herein. A camera 1730 may be located a certain distance (camera height 1711) above ground 1727. For example, the camera 1730 may be mounted on a vehicle that is in contact with a road.

The optical axis 1731 of the camera 1730 may project from the lens of the camera 1730. An x axis 1713 of the camera 1730 may correspond to a lateral dimension (e.g., left/right) that is orthogonal to the optical axis 1731. A y axis 1715 of the camera 1730 may correspond to a vertical dimension (e.g., up/down) that is orthogonal to both the optical axis 1731 and the x axis 1713. A z axis 1717 of the camera 1730 may correspond to a depth dimension (e.g., forward/backward) in relation to the optical axis 1731.

Corresponding dimensions in a world frame are also depicted. An $x_w$ axis 1721 may correspond to a lateral dimension (e.g., left/right) in relation to the ground 1727. A $y_w$ axis 1723 may correspond to a vertical dimension (e.g., up/down) in relation to the ground 1727. A $z_w$ axis 1717 of the camera 1725 may correspond to a depth dimension (e.g., forward/backward) with relation to ground 1727.

A pitch ($\phi$) 1719 may be the angle of the camera 1730 with respect to the ground 1727. The pitch ($\phi$) 1719 may be defined as the angle of the camera 1730 about a first dimension (e.g., x axis 1713) that is orthogonal to the optical axis 1731 of the camera 1730. In an implementation, the camera 1730 may be mounted on the vehicle with a known angle (i.e., pitch ($\phi$) 1719).

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:
   a memory; and
   a processor in communication with the memory, the processor configured to:
      determine a red-green-blue (RGB)-to-grayscale conversion that maximizes intensity distances between a lane marker color and a road color in an image;
      extract a lane response map from the RGB-to-grayscale conversion of the image the lane response map including a plurality of lane response values, wherein a lane response value for a pixel in the lane response map is determined based on a penalty component that reduces the lane response value as a difference between neighboring pixel values increases;
      transform the lane response map to an inverse-perspective-mapping (IPM) domain;
      define one or more sections in the IPM domain of the lane response map;
      detect one or more straight lane-marker segments in the one or more sections based on a Radon transform of the lane response map in the IPM domain; and
      cluster the one or more straight lane-marker segments to obtain one or more lane markers.

2. The electronic device of claim 1, wherein defining the multiple sections is further based on at least one of a lane-marker segment width assumption, a pre-defined detection distance range, or calibration data.

3. The electronic device of claim 1, wherein the processor is further configured to:
   perform a transform in each of the multiple sections; and
   obtain a lane-marker position and a lane-marker orientation based on the transform.

4. The electronic device of claim 1, wherein the processor is further configured to filter one or more potential straight line segments to reduce false positives.

5. The electronic device of claim 1, wherein the processor is further configured to refine the one or more lane markers.

6. The electronic device of claim 5, wherein the processor is further configured to optimize a score function to obtain the one or more lane markers.

7. The electronic device of claim 1, wherein the processor is further configured to apply a fitting to the one or more lane markers.

8. The electronic device of claim 1, wherein the processor configured to extract the lane response map from the image comprises the processor configured to perform row-wise one-dimensional (1D) filtering on the image.

9. The electronic device of claim 1, wherein the processor configured to determine the RGB-to-grayscale conversion that maximizes intensity distances between the lane marker color and the road color in the image comprises:
   convert the image from a red-green-blue (RGB) color model to a grayscale color model; and
   apply a trained projection model that maximizes intensity distances between the lane marker color and the road color using a linear discriminant analysis.

10. The electronic device of claim 1, wherein the processor is further configured to apply an ego-lane mask to the image to restrict a lane-marker search region.

11. A method, comprising:
determining a red-green-blue (RGB)-to-grayscale conversion that maximizes intensity distances between a lane marker color and a road color in an image;
extracting a lane response map from the RGB-to-grayscale conversion of the image, the lane response map including a plurality of lane response values, wherein a lane response value for a pixel in the lane response map is determined based on a penalty component that reduces the lane response value as a difference between neighboring pixel values increases;
transforming the lane response map to an inverse-perspective-mapping (IPM) domain;
defining one or more sections in the IPM domain of the lane response map;
detecting one or more straight lane-marker segments in the one or more sections based on a Radon transform of the lane response map in the IPM domain; and
clustering the one or more straight lane-marker segments to obtain one or more lane markers.

12. The method of claim 11, wherein extracting the lane response map from the image comprises performing row-wise one-dimensional (1D) filtering on the image.

13. The method of claim 11, wherein determining the RGB-to-grayscale conversion that maximizes intensity distances between a lane marker color and a road color in the image comprises:
converting the image from a red-green-blue (RGB) color model to a grayscale color model; and
applying a trained projection model that maximizes intensity distances between the lane marker color and the road color using a linear discriminant analysis.

14. The method of claim 11, further comprising applying an ego-lane mask to the image to restrict a lane-marker search region.

15. A non-transitory computer readable medium storing computer executable code, comprising:
code for causing an electronic device to determine a red-green-blue (RGB)-to-grayscale conversion that maximizes intensity distances between a lane marker color and a road color in an image;
code for causing the electronic device to extract a lane response map from the RGB-to-grayscale conversion of the image, the lane response map including a plurality of lane response values, wherein a lane response value for a pixel in the lane response map is determined based on a penalty component that reduces the lane response value as a difference between neighboring pixel values increases;
code for causing the electronic device to transform the lane response map to an inverse-perspective-mapping (IPM) domain;
code for causing the electronic device to define one or more sections in the IPM domain of the lane response map;
code for causing the electronic device to detect one or more straight lane-marker segments in the one or more sections based on a Radon transform of the lane response map in the IPM domain; and
code for causing the electronic device to cluster the one or more straight lane-marker segments to obtain one or more lane markers.

16. The computer readable medium of claim 15, wherein the code for causing the electronic device to extract the lane response map from the image comprises performing row-wise one-dimensional (1D) filtering on the image.

17. The computer readable medium of claim 15, wherein the code for causing the electronic device to determine the RGB-to-grayscale conversion that maximizes intensity distances between a lane marker color and a road color in the image comprises:
code for causing the electronic device to convert the image from a red-green-blue (RGB) color model to a grayscale color model; and
code for causing the electronic device to apply a trained projection model that maximizes intensity distances between the lane marker color and the road color using a linear discriminant analysis.

18. The computer readable medium of claim 15, further comprising code for causing the electronic device to apply an ego-lane mask to the image to restrict a lane-marker search region.

19. An apparatus, comprising:
means for determining a red-green-blue (RGB)-to-grayscale conversion that maximizes intensity distances between a lane marker color and a road color in an image;
means for extracting a lane response map from the RGB-to-grayscale conversion of the image, the lane response map including a plurality of lane response values, wherein a lane response value for a pixel in the lane response map is determined based on a penalty component that reduces the lane response value as a difference between neighboring pixel values increases;
means for transforming the lane response map to an inverse-perspective-mapping (IPM) domain;
means for defining one or more sections in the IPM domain of the lane response map;
means for detecting one or more straight lane-marker segments in the one or more sections based on a Radon transform of the lane response map in the IPM domain; and
means for clustering the one or more straight lane-marker segments to obtain one or more lane markers.

20. The apparatus of claim 19, wherein the means for extracting the lane response map from the image comprise means for performing row-wise one-dimensional (1D) filtering on the image.

21. The apparatus of claim 19, wherein the means for determining the RGB-to-grayscale conversion that maximizes intensity distances between a lane marker color and a road color in the image comprise:
means for converting the image from a red-green-blue (RGB) color model to a grayscale color model; and
means for applying a trained projection model that maximizes intensity distances between the lane marker color and the road color using a linear discriminant analysis.

22. The apparatus of claim 19, further comprising means for applying an ego-lane mask to the image to restrict a lane-marker search region.

* * * * *